US012779843B2

(12) United States Patent
Yoneya et al.

(10) Patent No.: US 12,779,843 B2
(45) Date of Patent: Nov. 3, 2026

(54) PRINTING APPARATUS AND PRINTING METHOD

(71) Applicant: SCREEN Holdings Co., Ltd., Kyoto (JP)

(72) Inventors: Kazuaki Yoneya, Kyoto (JP); Tomoyuki Sakai, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 100 days.

(21) Appl. No.: 19/034,914

(22) Filed: Jan. 23, 2025

(65) Prior Publication Data

US 2025/0249678 A1 Aug. 7, 2025

(30) Foreign Application Priority Data

Feb. 2, 2024 (JP) ................................ 2024-015078

(51) Int. Cl.

*B41J 2/21* (2006.01)
*B41J 2/045* (2006.01)
*B41J 11/00* (2006.01)

(52) U.S. Cl.

CPC ......... *B41J 2/04508* (2013.01); *B41J 2/2114* (2013.01); *B41J 2/2117* (2013.01); *B41J 2/2139* (2013.01); *B41J 2/2142* (2013.01); *B41J 2/2146* (2013.01); *B41J 11/00212* (2021.01); *B41J 11/00214* (2021.01); *B41J 2/04581* (2013.01)

(58) Field of Classification Search

CPC ...... B41J 2/2114; B41J 2/2117; B41J 2/2139; B41J 2/2142; B41J 11/00212; B41J 11/00214

See application file for complete search history.

(56) References Cited

U.S. PATENT DOCUMENTS

2002/0054180 A1 5/2002 Shibata et al.
2006/0268034 A1 11/2006 Lee et al.
2007/0085866 A1* 4/2007 Vladislav .............. B41J 29/393 347/9
2015/0298454 A1 10/2015 Fukazawa et al.
2019/0275790 A1 9/2019 Nakazawa et al.
2023/0241903 A1* 8/2023 Ikeuchi ................ B41J 11/0015 347/21
2024/0092078 A1 3/2024 Yoneya et al.

FOREIGN PATENT DOCUMENTS

JP 2014-188785 A 10/2014
JP 2018-069530 A 5/2018

* cited by examiner

*Primary Examiner* — Sharon Polk
(74) *Attorney, Agent, or Firm* — Rimon P.C.

(57) ABSTRACT

To suppress the occurrence of image defects caused by a defective nozzle and other factors in a printed image on a base material by an inkjet printing apparatus, a region to be corrected in the image is determined. When the region to be corrected is a single-color high-density region to be formed by ejecting a single-color ink, or when the region is a mixed-color high-density region to be formed using two or more color inks, and the amount of ink in the color from the defective nozzle has a high total area coverage percentage, printing data is corrected such that the color ink ejection to the region is performed after white ink or transparent ink is ejected. Based on the corrected printing data, the printed image is formed on the base material, thereby suppressing the occurrence of image defects caused by the defective nozzle and other factors.

19 Claims, 30 Drawing Sheets

FIG. 22

| Determination Target Region (Defective Image Region) | Region R1 | Region R2 | Region R3 | Region R4 | Region R5 | Region R6 |
|---|---|---|---|---|---|---|
| | Single Colors | | Mixed Colors | | | |
| C | 50% | 90% | 90% | 70% | 80% | 80% |
| M | 0% | 0% | 50% | 50% | 10% | 10% |
| Y | 0% | 0% | 0% | 0% | 10% | 40% |
| K | 0% | 0% | 0% | 0% | 10% | 40% |
| Total Area Coverage | 50% | 90% | 140% | 120% | 110% | 170% |
| Defectivet Nozzle Ink Amount Percentage (C Ink Amount / Total Area Coverage) | 100% | 100% | 64% | 58% | 73% | 47% |
| Necessity For White Correction | No | Yes | Yes | No | Yes | No |

(A)

(B)

(A)

(B)

PRINTING APPARATUS AND PRINTING METHOD

BACKGROUND OF THE INVENTION

1. Field of the Invention

The present invention relates to a printing apparatus equipped with inkjet heads (printheads) including numerous inkjet nozzles, and a printing method using the same.

2. Description of the Related Art

Conventionally, an inkjet-type printing apparatus (hereinafter referred to simply as an "inkjet printing apparatus") that perform printing by ejecting ink onto printing media, such as print paper, are known. In general, an inkjet printing apparatus perform printing using water-based ink. However, in recent years, there has been active development of an inkjet printing apparatus that performs printing using UV ink (ultraviolet-curable ink), for example, for label printing. In such an inkjet printing apparatus using UV ink, the UV ink is ejected by an inkjet head and cured by UV light (ultraviolet) irradiation to be fixed to a base material serving as a printing medium.

Incidentally, in an inkjet printing apparatus, there are individual variations among the nozzles in the inkjet head. Therefore, even when ink is ejected through these numerous nozzles in accordance with the same drive signal, the amount of ink ejected varies among the nozzles. In this condition, printing does not result in a high-quality print product. Accordingly, density uniformity correction, which is printing data density correction to ensure that all nozzles eject ink uniformly, is performed.

Furthermore, the inkjet printing apparatus may experience ink ejection failure due to factors such as ink solidification resulting from prolonged inactivity. Such failure can lead to missing dots in printed images, i.e., dot missing, corresponding to nozzles in an ejection failure state (referred to below as "defective nozzles"). Therefore, nozzle-defect correction, which is printing data density correction to ensure that ink that should be ejected through the defective nozzles is ejected through other nozzles (typically, those adjacent to the defective nozzles), is performed. Note that Japanese Laid-Open Patent Publication No. 2014-188785 discloses an example of nozzle-defect correction.

Density uniformity correction and nozzle-defect correction will be further described with reference to FIG. 37. Here, focus will be placed on five pixels 9(1) to 9(5) corresponding to five nozzles. These five pixels 9(1) to 9(5) are assumed to undergo single-color printing using ink of the same color ejected through the five nozzles. Moreover, printing data is assumed to be generated by RIP processing and designate a density of 50 (dot %) for all five pixels 9(1) to 9(5), as indicated in the portion denoted by reference numeral 91. Density uniformity correction is performed to correct the densities of five pixels 9(1) to 9(5), for example, as indicated in the portion denoted by reference numeral 92. In this example, the density of pixel 9(1) is corrected to 40, which is 4/5 of 50, because the nozzle corresponding to pixel 9(1) ejects 5/4 times the ink ejected through the nozzle corresponding to pixel 9(2) in accordance with the same drive signal. In addition, the density of pixel 9(4) is corrected to 60, which is 6/5 of 50, because the nozzle corresponding to pixel 9(4) ejects 5/6 times the ink ejected through the nozzle corresponding to pixel 9(2) in accordance with the same drive signal. In this example, of the five nozzles, the nozzle corresponding to pixel 9(3) is a defective nozzle. Therefore, nozzle-defect correction is performed on the data representing the portion denoted by reference numeral 92. As a result, the densities of five pixels 9(1) to 9(5) are corrected as indicated in the portion denoted by reference numeral 93. In this regard, the density of pixel 9(3) is 40 before nozzle-defect correction, and therefore 20 is added to the density of pixel 9(2) and also to the density of pixel 9(4). That is, the density of pixel 9(2) is corrected to 70, and the density of pixel 9(4) is corrected to 80.

Density uniformity correction and nozzle-defect correction, as described above, suppress the occurrence of image defects caused by individual variations among nozzles and defective nozzles (such as density decreases that appear as streaks due to dot missing).

However, in cases where there is a defective nozzle, even when nozzle-defect correction is performed to ensure that the amount of ink that should originally be ejected through the defective nozzle is compensatorily ejected by other nozzles, the resulting print product may still not be defect-free to an acceptable extent. In particular, when a nozzle corresponding to a region undergoing single-color, high-density printing malfunctions, the dot size of ink ejected through other nozzles tends to be insufficient to rectify image defects due to dot missing. In this manner, conventional nozzle-defect correction may not result in print products of sufficient quality, depending on the images being printed.

Furthermore, in general, the inkjet head includes a plurality of head modules, and uneven density and color may appear in overlapping portions between regions where one head module ejects ink and regions where adjacent head modules eject ink.

SUMMARY OF THE INVENTION

Therefore, an object of the present invention is to provide an inkjet printing apparatus capable of ensuring that the quality reduction of print products due to factors such as dot missing and uneven density and color, as mentioned above, in printed images, is suppressed to an acceptable extent.

One aspect of the present invention provides a printing apparatus for forming a printed image on a printing medium by ejecting ink onto the printing medium based on printing data, including:

- a transportation portion configured to transport the printing medium;
- a first inkjet head configured to eject a first ink onto the printing medium being transported by the transportation portion, the first inkjet head including a plurality of ink ejection ports;
- a second inkjet head configured to eject a second ink onto the printing medium being transported by the transportation portion, the second inkjet head including a plurality of ink ejection ports;
- a third inkjet head configured to eject a third ink onto the printing medium being transported by the transportation portion, the third inkjet head including a plurality of ink ejection ports and being disposed upstream of the first and second inkjet heads when viewed in a direction in which the printing medium is transported by the transportation portion;
- a processor; and
- a memory that stores a program, wherein
- the first ink has a larger wetting spread range on the printing medium when the first ink is ejected onto the third ink on the printing medium than when the first ink is ejected directly onto the printing medium, the second ink has a larger wetting spread range on the printing medium when the second ink is ejected onto the third ink on the printing medium than when the second ink is ejected directly onto the printing medium, if the first and second inks are ejected so as to mix, the wetting spread ranges of the first and second inks on the printing medium are larger when the first and second inks are ejected onto the third ink on the printing medium than when the first and second inks are ejected directly onto the printing medium, and the program, when executed by the processor, causes the processor to perform:

determining a correction region that is to be corrected using the third ink in the printed image formed on the printing medium; and controlling the first inkjet head, the second inkjet head, and the third inkjet head to eject the third ink into the correction region before ejecting the first ink to form the printed image and to eject the third ink into the correction region before ejecting the second ink to form the printed image.

In the above aspect of the present invention, when viewed in the direction in which the printing medium is transported by the transportation portion, the printing apparatus has the third inkjet head for ejecting the third ink disposed upstream of the first and second inkjet heads for ejecting the first and second inks to form the printed image on the printing medium. The program, when executed by the processor, causes the processor to perform determining a correction region that is to be corrected using the third ink in the printed image formed on the printing medium. The third ink is ejected into the correction region before the first ink is ejected to form the printed image, and the third ink is further ejected into the correction region before the second ink is ejected to form the printed image. The first ink has a larger wetting spread range on the printing medium when the first ink is ejected onto the third ink on the printing medium than when the first ink is ejected directly onto the printing medium. The same applies to the second ink. Moreover, if the first and second inks are ejected so as to mix, the wetting spread ranges of the first and second inks on the printing medium are larger when the first and second inks are ejected onto the third ink on the printing medium than when the first and second inks are ejected directly onto the printing medium. Therefore, not only when either the first or second ink is ejected into the correction region, but also when the first and second inks are ejected so as to mix, the dot sizes of the first and second inks are larger than originally intended. Thus, enhanced print quality can be achieved compared to conventional practices by determining correction regions that encompass, for example, regions corresponding to defective nozzles and overlapping portions between regions where one inkjet head ejects ink and regions where adjacent inkjet heads eject ink.

In the above aspect of the invention, it is preferred that in the determining the correction region, the correction region is determined based on a position of a defective ink ejection port that is an ink ejection port having ejection failure among the ink ejection ports included in the first or second inkjet head.

In this configuration, if a defective ink ejection port (or inkjet nozzle) is detected in the first or second inkjet head, the correction region is determined taking into consideration the position of the defective ink ejection port. This suppresses the occurrence of uneven print quality due to the presence of defective ink ejection ports.

In the above configuration, it is further preferred that the correction region determination is configured to determine the correction region so as to include a portion where the third ink is ejected through an ink ejection port included in the third inkjet head and corresponding to an ink ejection port adjacent to the defective ink ejection port.

This configuration effectively suppresses the occurrence of defects in printed images due to the presence of defective ink ejection ports.

Furthermore, in the above aspect of the invention, it is preferred that in the determining the correction region, when the correction region is a single-color region where either the first or second ink is ejected, the correction region is determined based on the printing data so as to include only a portion where an amount of the ejected ink is higher than a predetermined first determination criterion value, and when the correction region is a mixed-color region where both the first and second inks are ejected so as to mix in colors, the correction region is determined based on the printing data so as to include only a portion where the first and second inks are ejected with a total area coverage higher than a predetermined second determination criterion value and where an amount of ink in the color from either the first or second inkjet head including the defective ink ejection port is higher in percentage relative to the total area coverage than a predetermined third determination criterion value.

In the above configuration, when the correction region that should undergo nozzle-defect correction to suppress the occurrence of image defects caused by a defective ink ejection port is a single-color region where either the first or second ink is ejected, the correction region includes only a portion where the amount of the ejected ink is higher than the predetermined first determination value. Moreover, when the correction region that should undergo nozzle-defect correction is a mixed-color region where both the first and second inks are ejected so as to mix in colors, the correction region includes only a portion where the total area coverage is higher than the predetermined second determination value and where the amount of ink in the color from either the first or second inkjet head including the defective ink ejection port is higher in percentage relative to the total area coverage than the predetermined third determination criterion value. In this manner, regardless of whether the region is single-color or mixed-color, when nozzle-defect correction should be performed to suppress the occurrence of image defects caused by the defective ink ejection port, the determination of performing nozzle-defect correction with or without the third ink is based on a predetermined determination reference value, resulting in more appropriate and effective nozzle-defect correction than conventional practices.

Another aspect of the present invention provides a printing method using a printing apparatus for forming a printed image on a printing medium based on printing data, including a transportation portion configured to transport the printing medium, a first inkjet head configured to eject a first ink onto the printing medium being transported by the transportation portion, a second inkjet head configured to eject a second ink onto the printing medium being transported by the transportation portion, and a third inkjet head configured to eject a third ink onto the printing medium being transported by the transportation portion, the method including:

ejecting the first ink through the first inkjet head to form the printed image;

ejecting the second ink through the second inkjet head to form the printed image;

determining a correction region that is to be corrected using the third ink in the printed image formed on the printing medium;

ejecting the third ink into the correction region through the third inkjet head before the first ink is ejected to form the printed image; and ejecting the third ink into the correction region through the third inkjet head before the second ink is ejected to form the printed image, wherein, the first ink has a larger wetting spread range on the printing medium when the first ink is ejected onto the third ink on the printing medium than when the first ink is ejected directly onto the printing medium, the second ink has a larger wetting spread range on the printing medium when the second ink is ejected onto the third ink on the printing medium than when the second ink is ejected directly onto the printing medium, and if the first and second inks are ejected so as to mix, the wetting spread ranges of the first and second inks on the printing medium are larger when the first and second inks are ejected onto the third ink on the printing medium than when the first and second inks are ejected directly onto the printing medium.

The above aspect of the invention achieves effects similar to those of the foregoing aspect of the invention.

These and other objects, features, modes, and effects of the invention will become more apparent from the following detailed description of the invention with reference to the accompanying drawings.

BRIEF DESCRIPTION OF THE DRAWINGS

FIG. 22 is a table for describing an example of determining the necessity of white correction in the first embodiment;

DESCRIPTION OF THE EMBODIMENTS

Hereinafter, embodiments of the present invention will be described with reference to the accompanying drawings.

1. First Embodiment

<1.1 Overall Configuration of the Printing System>

Figure 1:
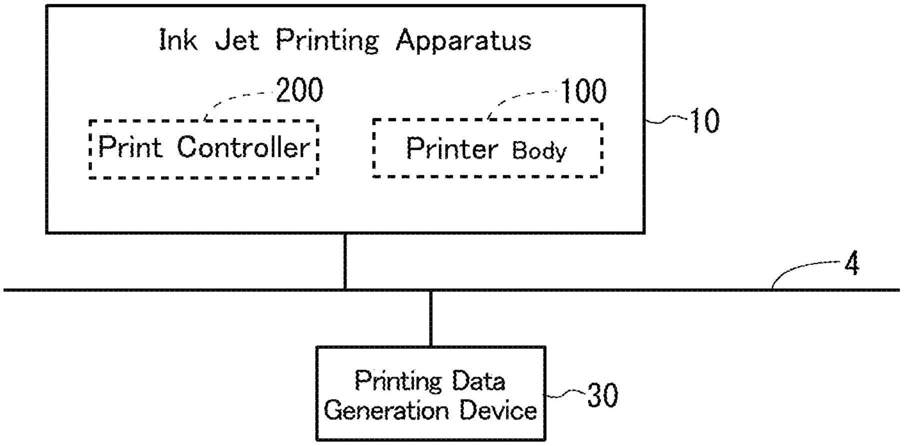
FIG. 1 is an overall configuration diagram of a printing system according to a first embodiment of the present invention.

FIG. 1 is an overall configuration diagram of a printing system according to a first embodiment of the present invention. This printing system includes an inkjet printing apparatus 10 and a printing data generation device 30. The inkjet printing apparatus 10 and the printing data generation device 30 are connected to each other via a communication line 4. The printing data generation device 30 generates printing data by performing RIP processing or suchlike on manuscript data in the form of, for example, a PDF file. The printing data contains respective density data for a plurality of color inks. The printing data generation device 30 transmits the generated printing data to the inkjet printing apparatus 10 via the communication line 4. Based on the printing data transmitted by the printing data generation device 30, the inkjet printing apparatus 10 performs printing by ejecting ink onto a base material, such as film or print paper, which serves as a printing medium, without using a printing plate. In this regard, the present embodiment employs UV ink (ultraviolet-curable ink) as printing ink. The inkjet printing apparatus 10 includes a printer body 100 and a print controller 200 for controlling the operation of the printer body 100.

<1.2 Configuration of the Inkjet Printing Apparatus>

Figure 2:
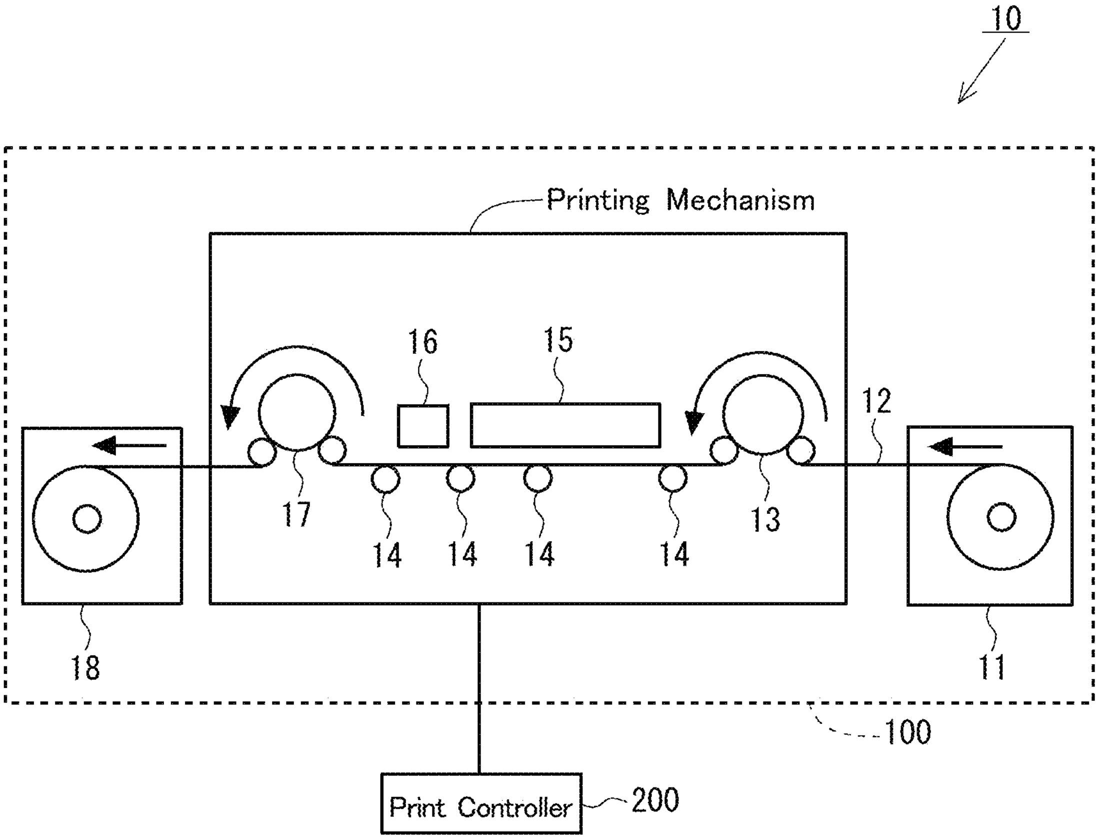
FIG. 2 is a schematic diagram illustrating a configuration example of an inkjet printing apparatus in the first embodiment.

FIG. 2 is a schematic diagram illustrating a configuration example of the inkjet printing apparatus 10. As described above, the inkjet printing apparatus 10 includes the printer body 100 and the print controller 200. The printer body 100 includes a base material feeding portion 11 for supplying a base material 12, a first drive roller 13 for transporting the base material 12 into a printing mechanism, a plurality of support rollers 14 for transporting the base material 12 within the printing mechanism, a recording portion 15 for recording an image on the base material 12 by ejecting ink onto the base material 12 and curing the ink, an imaging portion 16 for capturing the printed image (i.e., the resultant image on the base material 12 after printing), a second drive roller 17 for ejecting the base material 12 from inside the printing mechanism, and a base material winding portion 18 for winding the base material 12 after printing. As will be described later, the recording portion 15 includes inkjet heads for ejecting ink and ultraviolet light-emitting diode arrays (referred to below as UV-LED arrays) for curing the ink. The print controller 200 controls the operation of the printer body 100 as configured above. Note that the first drive roller 13, the support rollers 14, and the second drive roller 17 collectively serves as a transportation portion.

Incidentally, in the present embodiment, an inspection chart used for checking the state of nozzles in the inkjet heads is printed before executing the printing of a desired print product. The imaging portion 16 captures the resultant printed image of the inspection chart to obtain imaging data, which is then sent to the print controller 200. Thereafter, the print controller 200 performs density correction, which will be described later, based on the imaging data.

Figure 3:
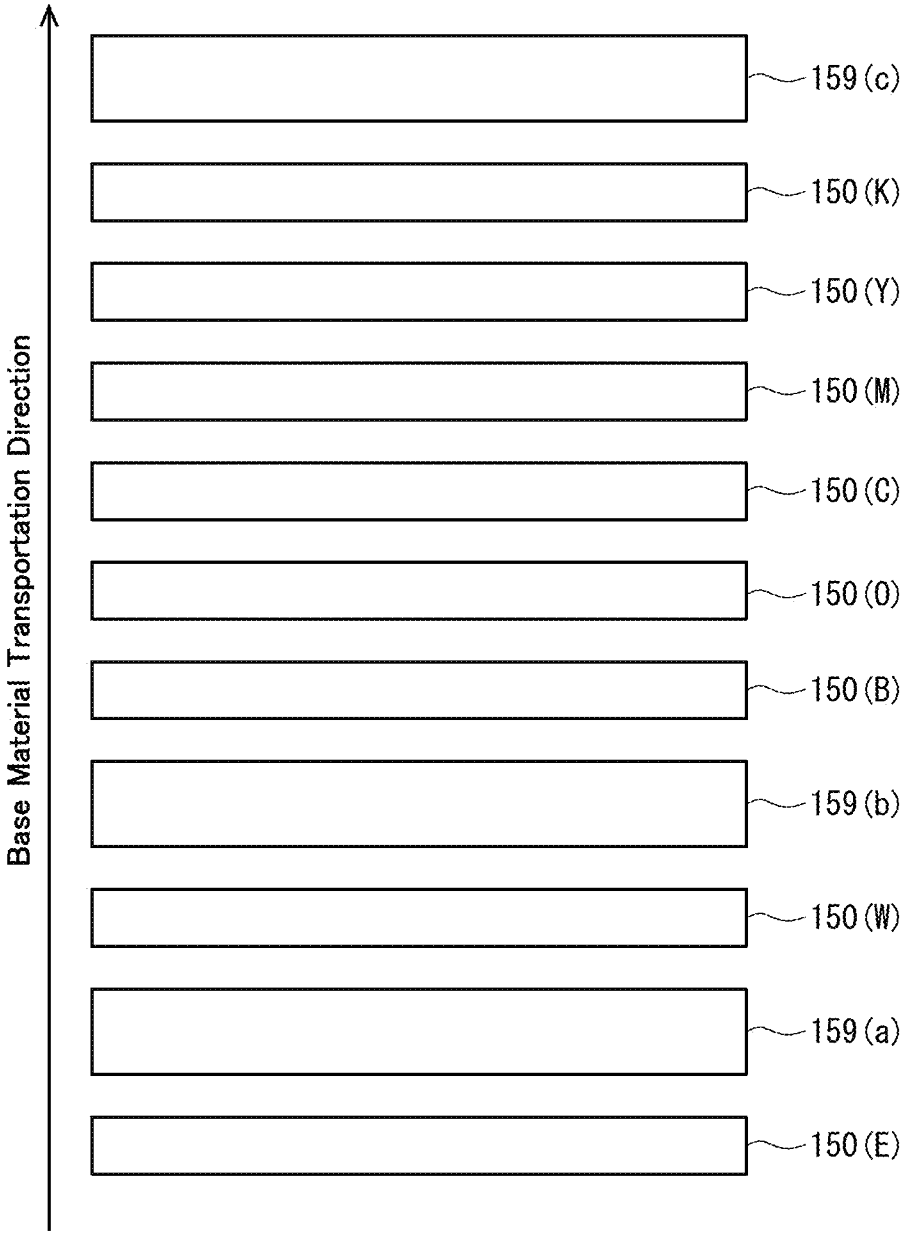
FIG. 3 is a plan view schematically illustrating the configuration of a recording portion in the first embodiment.

FIG. 3 is a plan view schematically illustrating the configuration of the recording portion 15 in the present embodiment. The recording portion 15 includes the inkjet heads 150 for ejecting ink onto the base material 12 and the UV-LED arrays 159 for curing the ink through ultraviolet irradiation. More specifically, the recording portion 15 is configured with the inkjet head 150(W) for ejecting white ink onto the base material 12, the UV-LED array 159(*b*) for curing the white ink through ultraviolet irradiation, the inkjet heads 150(B), 150(O), 150(C), 150(M), 150(Y), and 150(K) for ejecting blue, orange, cyan, magenta, yellow, and black inks, respectively, onto the base material 12, the UV-LED array 159(*c*) for curing these color inks (i.e., blue, orange, cyan, magenta, yellow, and black) through ultraviolet irradiation, the inkjet head 150(E) provided as a reserve, and the UV-LED array 159(*a*) for curing ink ejected onto the base material 12 by the inkjet head 150(E), through ultraviolet irradiation. In the present embodiment, the inkjet head 150(E) is used to eject transparent ink. The white inkjet head 150(W) and the transparent inkjet head 150(E) are disposed upstream of the color inkjet heads 150(B), 150(O), 150(C), 150(M), 150(Y), and 150(K) when viewed in the transportation direction of the base material 12.

In the present embodiment, the transparent inkjet head 150(E) and the white inkjet head 150(W) are selectively used depending on the type of base material 12 used for printing (i.e., whether the base material 12 is white or not). More specifically, when the base material 12 used for printing is white, the inkjet head 150(W) ejects white ink onto the base material 12. In this case, the inkjet head 150(E) does not eject transparent ink onto the base material 12. On the other hand, when the base material 12 used for printing is not white, the inkjet head 150(E) ejects transparent ink onto the base material 12. In this case, the inkjet head 150(W) does not eject white ink onto the base material 12.

The base material 12, serving as a printing medium, is transported from the bottom to the top in FIG. 3. Initially, either transparent or white ink is ejected onto the base material 12. Thereafter, the ejected ink is cured by the UV-LED array 159(*a*) or 159(*b*) corresponding to the transparent or white ink, respectively. Next, blue, orange, cyan, magenta, yellow, and black inks are sequentially ejected onto the base material 12 and then cured by the UV-LED array 159(*c*). Note that when white ink is ejected onto the base material 12 as a result of white correction, which will be described later, the UV-LED array 159(*b*) does not cure the white ink. Therefore, when white correction is performed, the color inks are ejected onto the uncured white ink. Moreover, when transparent ink is ejected onto the base material 12 by performing transparent correction, which will be described later, the UV-LED array 159(*a*) does not cure the transparent ink. Therefore, when transparent correction is performed, the color inks are also ejected onto the uncured transparent ink.

In the present embodiment, two or more inkjet heads among the inkjet heads 150(C), 150(M), 150(Y), 150(K), 150(O), and 150(B), which eject inks other than white and transparent inks (i.e., process-color and spot-color inks) serve as first and second inkjet heads, either the inkjet head 150(W) or 150(E) serves as a third inkjet head, the UV-LED array 159(*c*) serves as a first ultraviolet irradiation portion, and either the UV-LED array 159(*a*) or 159(*b*) serves as a second ultraviolet irradiation portion.

It should be noted that the configuration of the recording portion 15 shown in FIG. 3 is merely illustrative, and the present invention is not limited to this. For example, the recording portion 15 may be configured without the inkjet head 150(B) for ejecting blue ink or the inkjet head 150(O) for ejecting orange ink.

Figure 4:
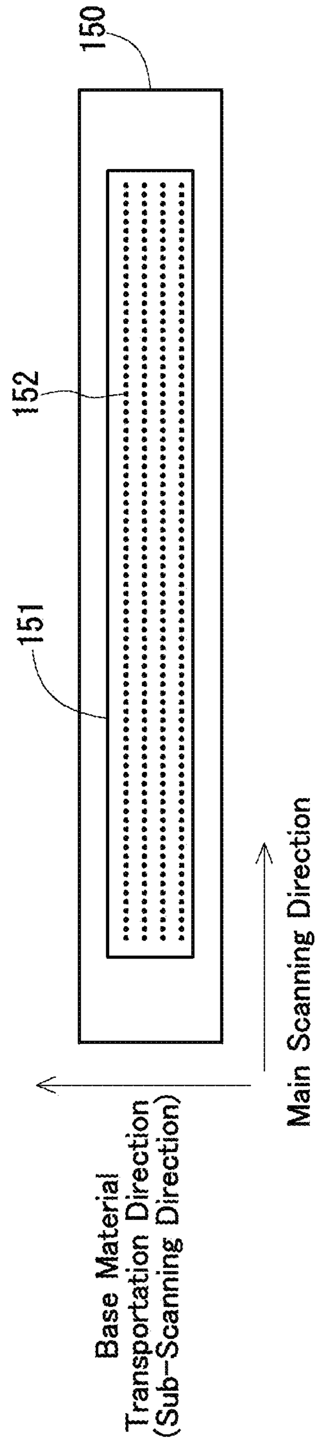
FIG. 4 is a plan view illustrating a configuration example of an ink ejection surface of an inkjet head in the first embodiment.

FIG. 4 is a plan view illustrating a configuration example of an ink ejection surface of one inkjet head 150. The inkjet head 150 includes a rectangular head module 151. The head module 151 has numerous nozzles 152 serving as ink ejection ports. In the example shown in FIG. 4, the head module 151 is shaped as one rectangle, but this is not limiting. Various configurations can be employed using a plurality of parallelogram-shaped or trapezoidal head modules. Note that since each nozzle corresponds to an ink ejection port, a defective nozzle, as described earlier, refers to a defective ink ejection port.

Figure 5:
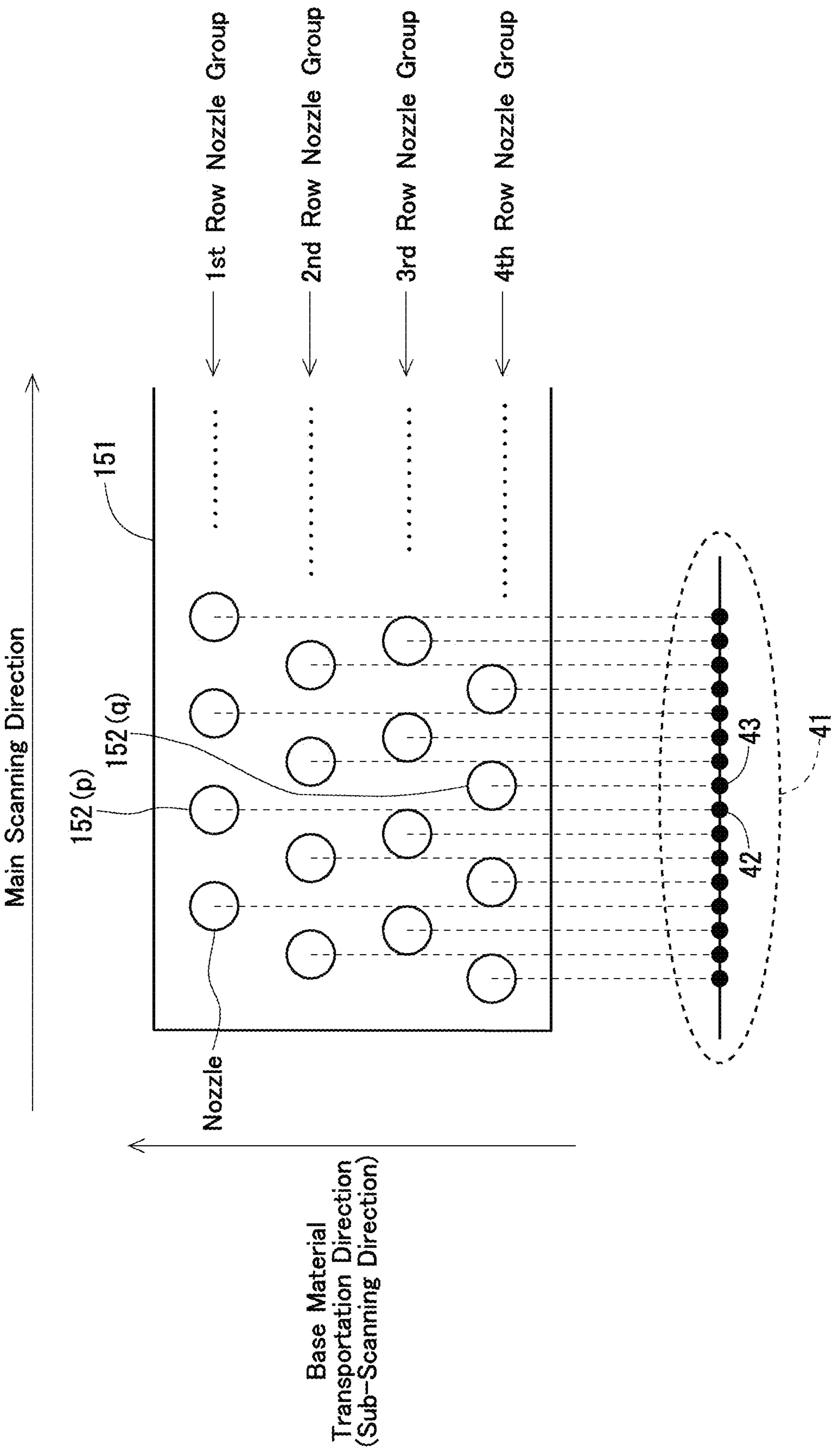
FIG. 5 is a diagram describing the arrangement of nozzles in a head module in the first embodiment.

FIG. 5 is a diagram describing the arrangement of the nozzles 152 in the head module 151. Typically, in the head module 151, the nozzles are arranged in rows in a main scanning direction, with each row constituting a nozzle group. In the example shown in FIG. 5, the head module 151 includes four rows or groups of nozzles. In FIG. 5, reference numeral 41 denotes a portion schematically showing landing positions of ink ejected by the nozzles 152 onto the base material 12. The nozzles 152 are arranged in the head module 151 such that the nozzles 152 in the first-, second-, third-, and fourth-row nozzle groups eject ink at different landing positions from one another. For example, each nozzle 152 in the first-row nozzle group ejects ink at a landing position between inks ejected by the nozzles 152 in the third- and fourth-row nozzle groups.

In the example shown in FIG. 5, the nozzles denoted by reference numerals 152(*p*) and 152(*q*) eject ink at adjacent landing positions 42 and 43. Two nozzles, such as those whose ink landing positions are adjacent as described above, are considered herein “adjacent nozzles”. In the above example, the nozzles denoted by reference numerals 152(*p*) and 152(*q*) are considered adjacent nozzles.

It should be noted that when the name of one color is referred to as “Z”, nozzles that eject Z ink (included in a Z inkjet head 150) will also be referred to below as “Z inkjet nozzles”. For example, the nozzles that eject cyan ink (included in the cyan inkjet head 150(C)) will also be referred to below as the “cyan inkjet nozzles”.

<1.3 Hardware Configuration of the Print Controller>

Figure 6:
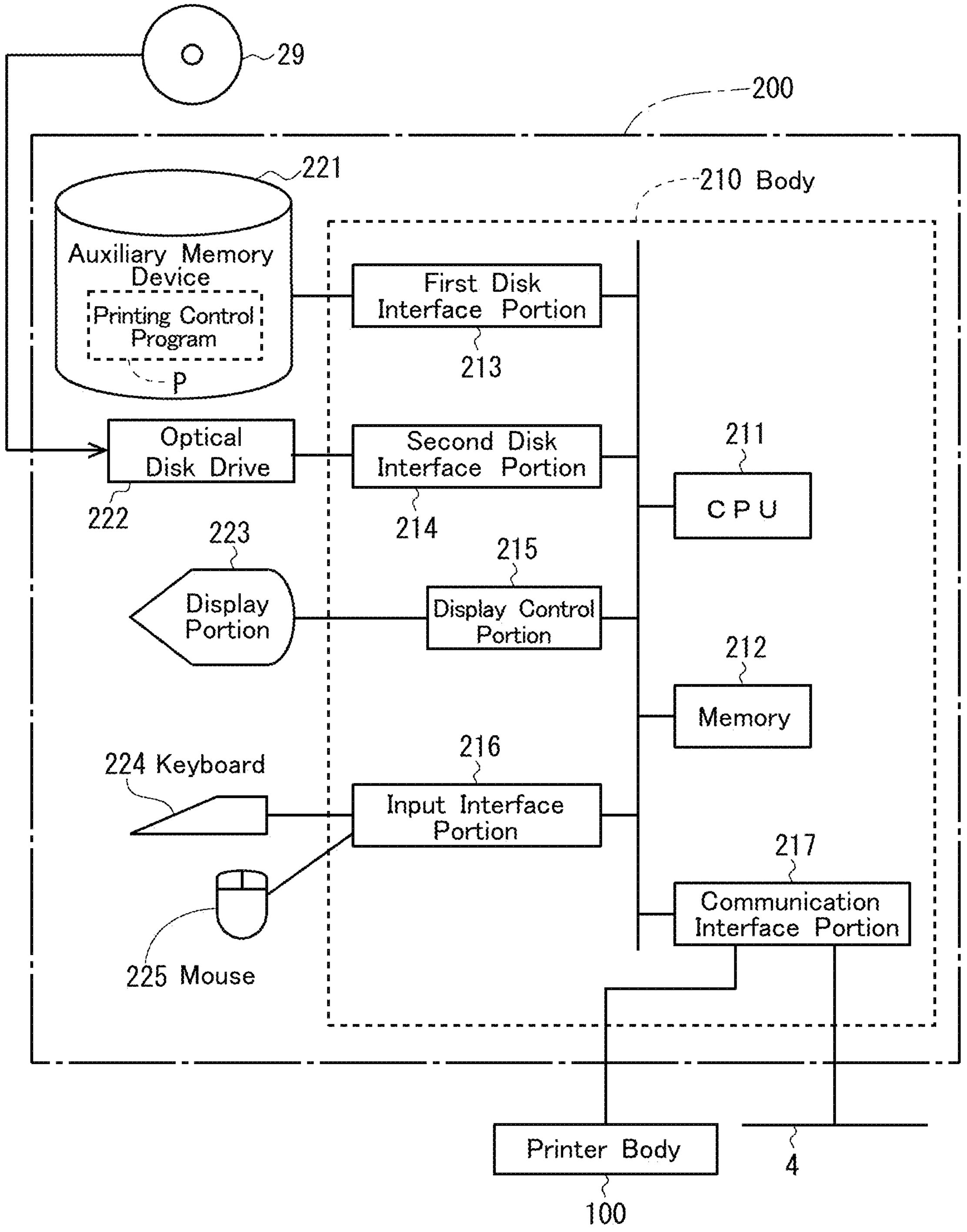
FIG. 6 is a block diagram illustrating the hardware configuration of a print controller in the first embodiment.

FIG. 6 is a block diagram illustrating the hardware configuration of the print controller 200. As shown in FIG. 6, the print controller 200 includes a body 210, an auxiliary memory device 221, an optical disk drive 222, a display portion (or display device) 223 (referred to below simply as a “display portion 223”), a keyboard 224, and a mouse 225. The body 210 includes a CPU (processor) 211, memory 212, a first disk interface portion 213, a second disk interface portion 214, a display control portion 215, an input interface portion 216, and a communication interface portion 217. The CPU 211, the memory 212, the first disk interface portion 213, the second disk interface portion 214, the display control portion 215, the input interface portion 216, and the communication interface portion 217 are connected to one another via a system bus. The auxiliary memory device 221 is connected to the first disk interface portion 213. The optical disk drive 222 is connected to the second disk interface portion 214. The display portion 223 is connected to the display control portion 215. The keyboard 224 and the mouse 225 are connected to the input interface portion 216. The printer body 100 is connected to the communication interface portion 217 via a communication cable. Moreover, the communication line 4 is connected to the communication interface portion 217. The auxiliary memory device 221 is a magnetic disk device or suchlike. The optical disk drive 222 receives an optical disk 29, which is a computer-readable recording medium, such as a CD-ROM or a DVD-ROM, i.e., a non-transitory recording medium. The display portion 223 is a liquid crystal display or suchlike. The display portion 223 is used to display information desired by the operator. The keyboard 224 and the mouse 225 are used to input a user instruction to the print controller 200.

The auxiliary memory device 221 has stored therein a printing control program P (used for controlling the execution of a printing process by the printer body 100). The CPU 211 executes the printing control program P in the memory 212 after reading the printing control program P from the auxiliary memory device 221, thereby achieving various functions of the print controller 200. The memory 212 includes a RAM and a ROM. The memory 212 functions as a work area for the CPU 211 to execute the printing control program P stored in the auxiliary memory device 221. Note that the printing control program P is provided in the state of being stored in the computer-readable recording medium (non-transitory recording medium). Specifically, for example, the user purchases the optical disk 29 as the recording medium of the printing control program P and inserts the optical disk 29 into the optical disk drive 222 with the result that the printing control program P is read from the optical disk 29 and installed onto the auxiliary memory device 221.

<1.4 White Correction>

In the present embodiment, when the base material used for printing as the printing medium is white, the density data contained in the printing data is corrected simultaneously with the aforementioned nozzle-defect correction, such that white ink is ejected by white inkjet nozzles that correspond to nozzles adjacent to a defective nozzle eject (referred to below as “defect-adjacent nozzles” for the sake of convenience). This process will be referred to below as “white correction”.

Figure 7:
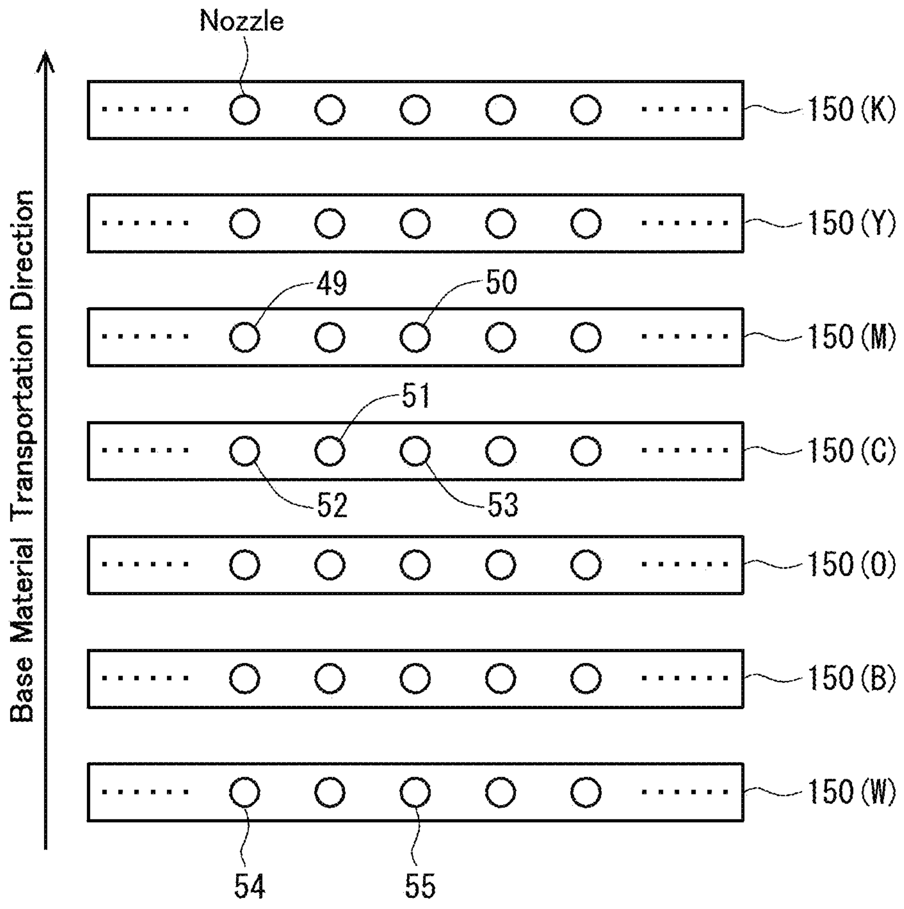
FIG. 7 is a diagram outlining white correction in the first embodiment.

FIG. 7 is a diagram outlining white correction. Note that, for the sake of convenience, FIG. 7 shows a plurality of nozzles arranged in a line within each inkjet head 150. Moreover, the UV-LED arrays 159 are not shown in FIG. 7. It is assumed here that among the nozzles included in the cyan inkjet head 150(C), the one denoted by reference numeral 51 is a defective nozzle. In this case, nozzle-defect correction, as described above, is performed, resulting in the defect-adjacent nozzles (denoted by reference numerals 52 and 53) ejecting cyan ink in a larger amount than originally intended. Moreover, performing white correction results in the nozzles that correspond to the defect-adjacent nozzles (denoted by reference numerals 54 and 55) ejecting white ink. Note that in this example, cyan ink serves as a first or second ink, while white ink serves as a third ink.

In the present embodiment, white correction is performed on a high-density portion of a region printed with single-color ink (referred to below as a single-color region), where this high-density portion is printed with the single-color ink that should be ejected through a defective nozzle. In the case where the defective nozzle is included in the cyan inkjet head 150(C), as described above, white correction is performed for a region that undergoes single-color printing using cyan ink with a high density of, for example, 80% or more. Note that determination criterion values for deciding on the region for which white correction should be performed (referred to below as the “white correction region” or simply as the “correction region”) will be described in detail later.

Furthermore, in the present embodiment, white correction is also performed for a region that undergoes mixed-color printing (referred to below as a "mixed-color region") using two or more inks other than white and transparent inks, selected from cyan (C), magenta (M), yellow (Y), black (K), blue (B), and orange (O) inks (i.e., process-color and spot-color inks). For example, in the case of a mixed-color region with cyan and magenta inks, when the cyan inkjet head 150(C) includes a defective nozzle, as described above, white correction is performed for a region where, for example, the total printing density of cyan and magenta inks is 90% or more and the printing density of the ink ejected by the inkjet head including the defective nozzle, i.e., cyan ink, is 70%. In this example, nozzles 52 and 53 in the cyan inkjet head 150(C), along with nozzles 49 and 50 in the magenta inkjet head 150(M), are defect-adjacent nozzles (see FIG. 7), one from the cyan and magenta inks corresponds to the first ink, the other corresponds to the second ink, and white ink serves as the third ink. Note that a determination criterion value for deciding which portion of the mixed-color region should undergo white correction (white correction region) will be described in detail later.

Figure 8:
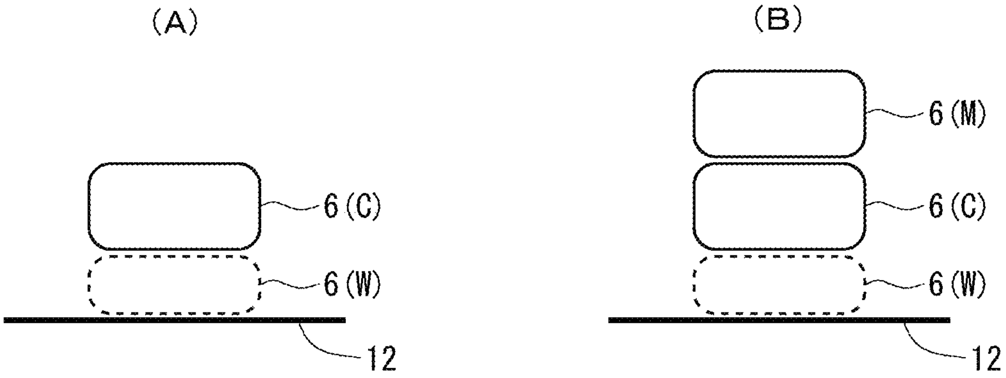
FIG. 8 consists of a diagram (A) describing ink ejection where white correction is performed in a single-color region in the first embodiment, and a diagram (B) describing ink ejection where white correction is performed in a mixed-color region in the first embodiment.

In the above example where the single-color region undergoes white correction, when white correction is performed, the white inkjet nozzles 54 and 55, which correspond to the defect-adjacent nozzles, initially eject white ink onto the base material 12 during printing. Thereafter, the defect-adjacent nozzles 52 and 53 in the cyan inkjet head 150(C) eject cyan ink. That is, in the regions subjected to white correction, cyan ink is ejected onto white ink that has been ejected onto the base material 12, as schematically shown in (A) of FIG. 8.

Figure 9:
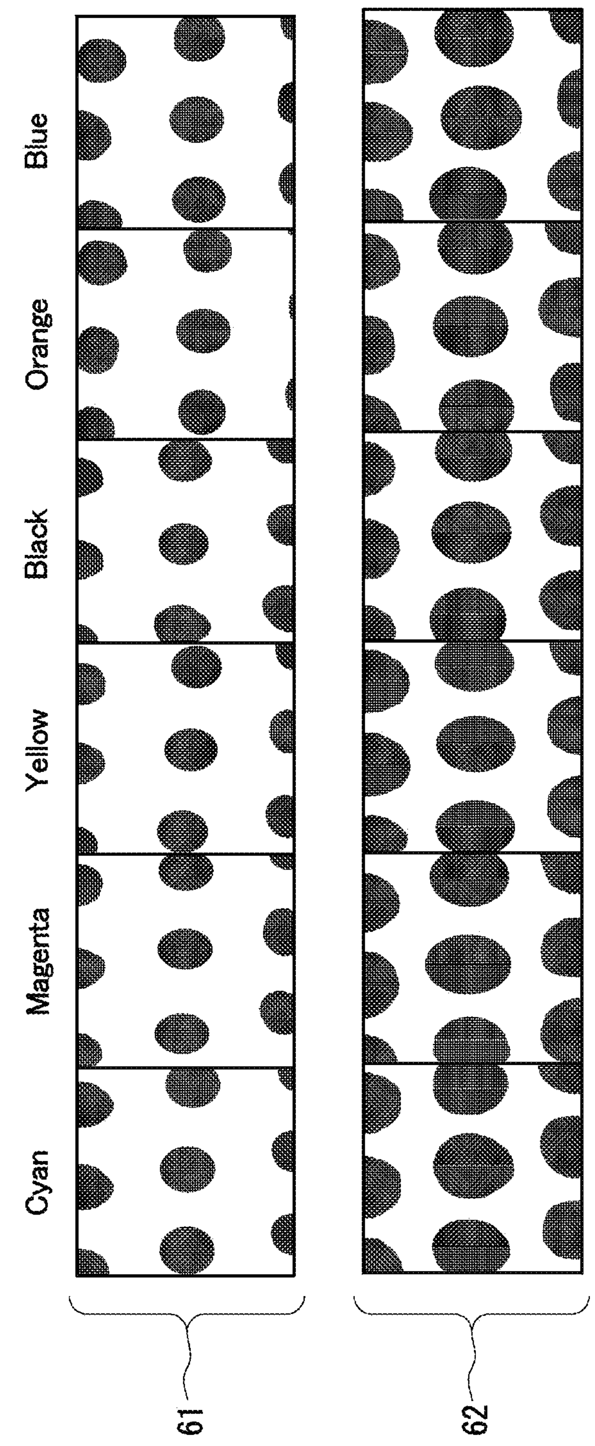
FIG. 9 is a diagram illustrating an example of experimental results for wetting spread of color inks on a film base material.

Incidentally, the wetting spread range of the color ink (in the above example, cyan ink) on the base material 12 is larger when the color ink is ejected onto the white ink that has been ejected onto the base material 12 than when the color ink is ejected directly onto the base material 12. Here, the wetting spread range refers to the area of a dot formed over the printing medium through ink ejection. Accordingly, the size of a dot formed through color ink ejection onto the base material 12 serving as the printing medium is larger when the color ink is ejected onto the white ink that has been ejected onto the base material 12 than when the color ink is ejected directly onto the base material 12. In relation to this, FIG. 9 shows an example of experimental results. In FIG. 9, reference numeral 61 denotes a portion exemplifying the size of each dot of color inks ejected directly onto a film base material, while reference numeral 62 denotes a portion exemplifying the size of each dot of the color inks ejected after white ink is ejected directly onto the same base material. For each color ink, it can be seen that the wetting spread range increases with the prior ejection of white ink onto the base material (i.e., the dot size of each color ink becomes larger in a pseudo manner). In view of the above, white ink is ejected in advance at positions where the defect-adjacent nozzles eject color inks onto the base material 12, resulting in the color inks ejected by the defect-adjacent nozzles spreading sufficiently onto the base material 12 and enhancing the effect of nozzle-defect correction (i.e., suppressing the occurrence of image defects due to the defective nozzle and thereby preventing reduced printing quality).

Furthermore, white ink ejection is normally followed by curing through ultraviolet irradiation. However, in the present embodiment, when white correction is performed, resulting in white ink being ejected into a target region, the UV-LED array 159(*b*) is either disabled from ultraviolet irradiation or allowed to perform ultraviolet irradiation on the white ink at a reduced intensity. Applying no ultraviolet irradiation or weak ultraviolet irradiation to the white ink, as described above, increases the wetting spread range of the white ink and effectively increases the wetting spread ranges of the color inks ejected onto the white ink.

In the above example where the mixed-color region undergoes white correction, when white correction is performed, the white inkjet nozzles 54 and 55, which correspond to the defect-adjacent nozzles, initially eject white ink onto the base material 12 during printing. Thereafter, the defect-adjacent nozzles 52 and 53 in the cyan inkjet head 150(C) eject cyan ink, followed by the defect-adjacent nozzles 49 and 50 in the magenta inkjet head 150(M) ejecting magenta ink (see FIG. 7). That is, in the regions subjected to white correction, cyan ink is ejected onto white ink that has been ejected onto the base material 12, and then magenta ink is ejected onto the cyan ink, as schematically shown in (B) of FIG. 8.

<1.5 White Correction Region Determination Method>

Conventional nozzle-defect correction (also referred to below as "normal nozzle-defect correction") may not sufficiently rectify defects in printed images caused by ink ejection failure (typically, density reductions that appear as streaks due to dot missing), as described earlier. Particularly in the case where image defects occur in a high-density, single-color region due to ejection failure, such image defects are not sufficiently rectified with the dot size of ink ejected by defect-adjacent nozzles. To rectify such defects in printed images, white correction as described above can be utilized, but white correction may be excessive or result in unnecessary white ink consumption, depending on the density of images to be printed or the amount of ink per pixel corresponding to that density. Accordingly, it is necessary to determine, in advance, suitable reference values for determining whether to perform white correction or normal nozzle-defect correction when there is an image defect in the single-color region due to ejection failure (i.e., determination criterion values for the suitability of white correction). Moreover, in the case where there is an image defect in the mixed-color region due to ejection failure, the suitability of white correction depends on total area coverage (TAC), which is the sum of per-pixel amounts of inks ejected into the mixed-color region. Moreover, even with the same total area coverage value, the suitability of white correction varies depending on the percentage of the per-pixel amount of ink that defective nozzles should eject into the mixed-color region relative to the total area coverage (referred to below as the "defective nozzle ink amount percentage").

Therefore, in the present embodiment, for cases where an image defect occurs in the single-color region due to ejection failure, the maximum total area coverage for sufficiently rectifying the image defect with normal nozzle-defect correction is determined as a first determination criterion value. Moreover, for cases where an image defect occurs in the mixed-color region due to ejection failure, combinations of the maximum total area coverage and the amount percentage for maximum defective nozzle ink sufficiently rectifying the image defect with normal nozzle-defect correction are determined in advance (these maximum values will be referred to below as "second and third determination criterion values", respectively).

<1.5.1 Determination Criterion Value for the Necessity for White Correction in the Single-Color Region>

Figure 10:
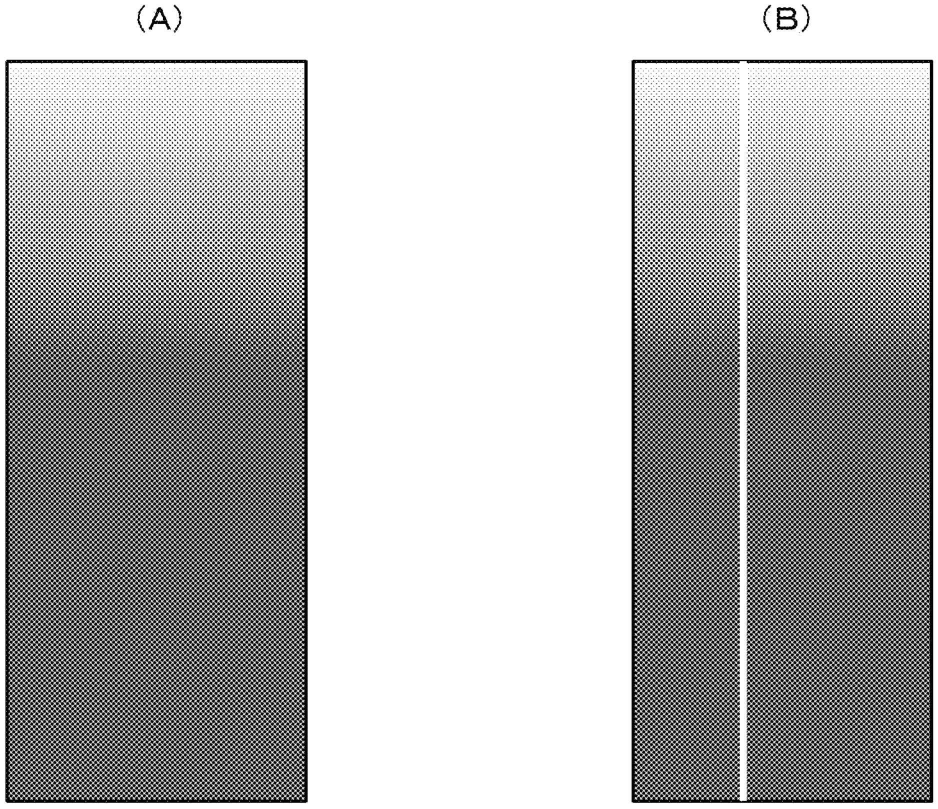
FIG. 10 consists of diagrams (A) and (B) describing a method for obtaining a determination criterion value for the necessity of white correction to rectify an image defect in the single-color region caused by a defective nozzle in the first embodiment.

A method is described for obtaining the first determination criterion value for the necessity of white correction to rectify an image defect caused by a defective nozzle in the single-color region. Printing data is initially prepared to include density data representing an image with a region where the single-color density changes continuously and monotonously in the transportation direction of the base material 12 (referred to below as a "single-color gradation region"), as shown in (A) of FIG. 10. When printing is performed using this printing data, with no ink ejected from only one nozzle in the inkjet head corresponding to the single color (this printing will be referred to below as "virtual defective nozzle printing"), a printed image is obtained with an image defect (i.e., a portion perceived as a white streak) due to dot missing, as shown in (B) of FIG. 10. To obtain the first determination criterion value for the density data contained in the printing data, normal nozzle-defect correction and white correction (i.e., nozzle-defect correction using white ink) are performed on the single-color gradation region, resulting in normal correction density data and white correction density data, respectively.

Next, virtual defective nozzle printing is performed using printing data that contains the normal correction density data, resulting in a printed image with an image defect in a single-color gradation region (referred to below as a "normal correction printed image"). Then, the single-color gradation region is visually inspected to identify a portion where the image defect can be rectified and to obtain the maximum density of the single color that allows normal nozzle-defect correction to sufficiently rectify the image defect. Here, the density of the single color corresponds to the amount of single-color ink per pixel and will be referred to below as the "single-color ink amount" and expressed in percentage, where the maximum amount of single-color ink usable per pixel is 100%. Note that in the single-color region, the amount of inks other than the single-color ink is 0, and therefore the amount of single-color ink is equal to the total area coverage. Therefore, in the present embodiment, the amount of single-color ink that corresponds to the maximum density obtained through visual inspection of the single-color gradation region of the normal correction printed image, as described above, is used as a tentative first determination criterion value. Thereafter, virtual defective nozzle printing is performed using printing data that contains the white correction density data, resulting in a printed image (referred to below as a "white correction printed image"). If a single-color gradation region of the white correction printed image is visually confirmed to not be excessively corrected at the tentative first determination criterion value, the tentative first determination criterion value is set as a first determination criterion value. If the single-color gradation region is determined to be excessively corrected at the tentative first determination criterion value, the single-color gradation region is visually inspected to determine the minimum density of the single color at which the image defect is rectified without excessive correction. The amount of single-color ink that can suitably rectify the image defect is visually determined within the range between the amounts of single-color ink that respectively correspond to the minimum and maximum densities. The determined amount is set as a first determination criterion value. However, the first determination criterion value may be determined using other methods, so long as the value is within the range between the amounts of single-color ink that respectively correspond to the minimum and maximum densities.

For each of the cyan, magenta, yellow, black, blue, and orange inks, the normal correction printed image and the white correction printed image, as described above, were actually formed on the base material 12 and subjected to visual inspection of the respective single-color gradation regions. The normal correction printed image was confirmed to have the image defect sufficiently rectified where the amount of single-color ink was 60% or less, while the white correction printed image was confirmed to have no excessive correction where the amount of single-color ink was 60%. Therefore, in the present embodiment, the first determination criterion value is set at 60%. As a result, when there is an image defect in the single-color region due to ejection failure of a defective nozzle, if the amount of single-color ink is 60% or less in a portion of the single-color region that covers the position corresponding to the defective nozzle, this portion is determined as a normal correction region. If the amount of single-color ink in the same portion is greater than 60%, that portion is determined as a white correction region.

<1.5.2 Determination Criterion Values for the Necessity for White Correction in the Mixed-Color Region>

Figure 11:
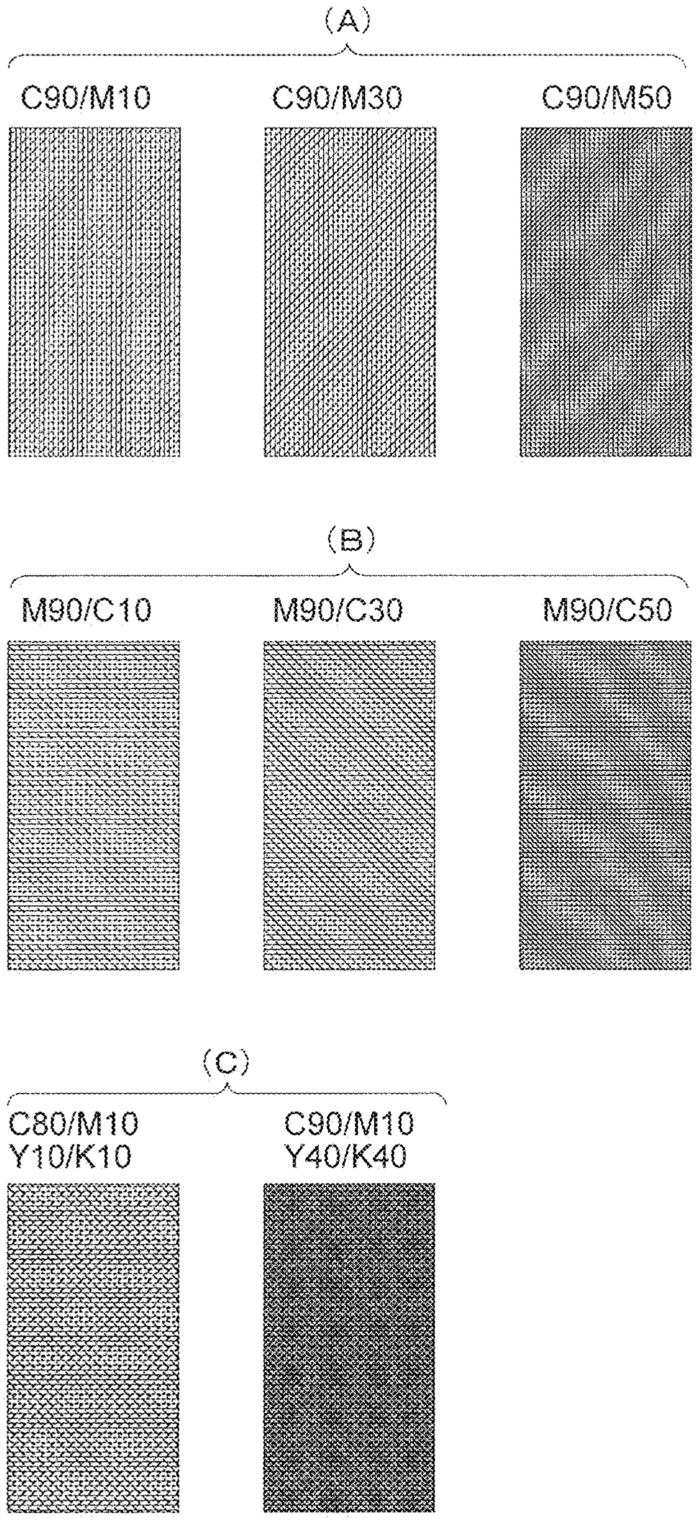
FIG. 11 consists of diagrams (A), (B), and (C) describing a method for obtaining determination criterion values for the necessity of white correction to rectify an image defect in the mixed-color region caused by a defective nozzle in the first embodiment.

Described next is a method for obtaining the second and third determination criterion values for the necessity of white correction to rectify an image defect caused by a defective nozzle in the mixed-color region. Printing data is initially prepared to include density data representing an image of the mixed-color region for each of various forms of color mixing as shown in (A) to (C) of FIG. 11. In FIG. 11, the notation "Xn/Zm" above each mixed-color region indicates that the mixed-color region is formed by ejecting X ink in an n % amount and Z ink in an m % amount. For example, among the three mixed-color regions shown in (A) of FIG. 11, the leftmost mixed-color region has the notation "C90/M10" indicating that this mixed-color region is formed by ejecting cyan (C) ink in a 90% amount and magenta (M) ink in a 10% amount.

For each of the printing data as prepared above (in the example shown in FIG. 11, eight pieces of printing data), it is assumed that there is no ink ejection from one nozzle in the inkjet head that should eject ink of one color used in the form of color mixing corresponding to the printing data. Normal nozzle-defect correction and white correction are performed on the mixed-color region in the density data of the printing data, resulting in normal correction density data and white correction density data, respectively.

Next, printing (virtual defective nozzle printing) is performed using printing data that contains the normal correction density data, with no ink ejected from only one nozzle in the inkjet head corresponding to the one color, resulting in a printed image (normal correction printed image) on the base material 12. The normal correction printed image is visually inspected to determine whether the image defect caused by the nozzle ejecting no ink into the mixed-color region has been rectified. Moreover, printing (virtual defective nozzle printing) is performed using printing data that contains the white correction density data, with no ink ejected from one nozzle in the inkjet head corresponding to the one color, resulting in a white correction printed image on the base material 12. The white correction printed image is visually inspected to determine whether the image defect caused by the nozzle ejecting no ink has been rectified. For each piece of printing data corresponding to the various forms of color mixing, the normal correction printed image and the white correction printed image, as described above, were visually inspected, and the results were assessed. In regard to the mixed-color region with an image defect caused by the defective nozzle, the image defect was confirmed to be rectified in the normal correction printed image corresponding to the mixed-color region, if the total area coverage was 90% or less, or the percentage of the amount of ink in the color that should have ejected by the defective nozzle (referred to below as the "defective nozzle color") relative to the total area coverage (referred to below as the "defective nozzle ink amount percentage") was 60% or less. Moreover, in regard to the mixed-color region with an image defect caused by the defective nozzle, the white correction printed image corresponding to the mixed-color region was not confirmed to be excessively corrected if the total area coverage was greater than approximately 90% and the defective nozzle ink amount percentage was greater than approximately 60%. Therefore, in the present embodiment, the second and third determination criterion values are set at 90% and 60%, respectively. As a result, when there is an image defect in the mixed-color region due to ejection failure of a defective nozzle, a portion of the mixed-color region that covers the position corresponding to the defective nozzle is determined as a normal correction region if the total area coverage is 90% or less, or the defective nozzle ink amount percentage is 60% or less, in the portion of the mixed-color region. If the total area coverage is greater than 90% and the defective nozzle ink amount percentage is greater than 60%, that portion is determined as a white correction region.

It should be noted that in the example shown in FIG. 11, for the sake of convenience, eight pieces of printing data are prepared to conduct the visual assessment of the normal correction printed images and the white correction printed images. However, in practice, a greater number of pieces of printing data are prepared than the number of various forms of color mixing and used to obtain practical determination criteria (i.e., the second and third determination criterion values) for the necessity of white correction in the mixed-color region. Moreover, the specific numerals of the first determination criterion value (60%), the second determination criterion value (90%), and the third determination criterion value (60%) are merely illustrative, and it is understood that other numerals can be used.

<1.6 Transparent Correction>

In the present embodiment, when the base material used for printing as the printing medium is not white (for example, transparent or silver), in the aforementioned nozzle-defect correction, the density data in the printing data is corrected such that transparent ink is ejected by transparent inkjet nozzles that correspond to nozzles adjacent to a defective nozzle (i.e., defect-adjacent nozzles). This process will be described below as "transparent correction".

Figure 12:
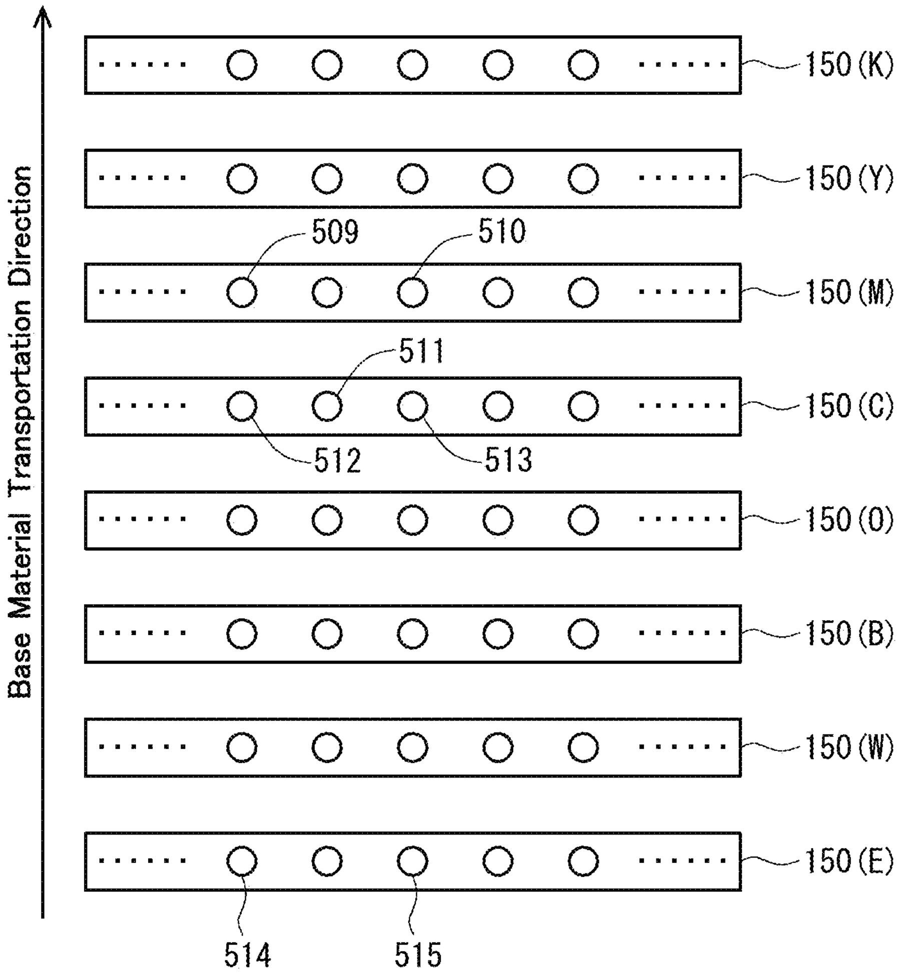
FIG. 12 is a diagram outlining transparent correction in the first embodiment.

It is assumed here that among the nozzles included in the cyan inkjet head 150(C), the one denoted by reference numeral 511 in FIG. 12 is a defective nozzle. In this case, nozzle-defect correction, as described above, is performed, resulting in the defect-adjacent nozzles (denoted by reference numerals 512 and 513) ejecting cyan ink in a larger amount than originally intended. Moreover, performing transparent correction results in the transparent inkjet nozzles (denoted by reference numerals 514 and 515) that correspond to the defect-adjacent nozzles ejecting transparent ink.

Figure 13:
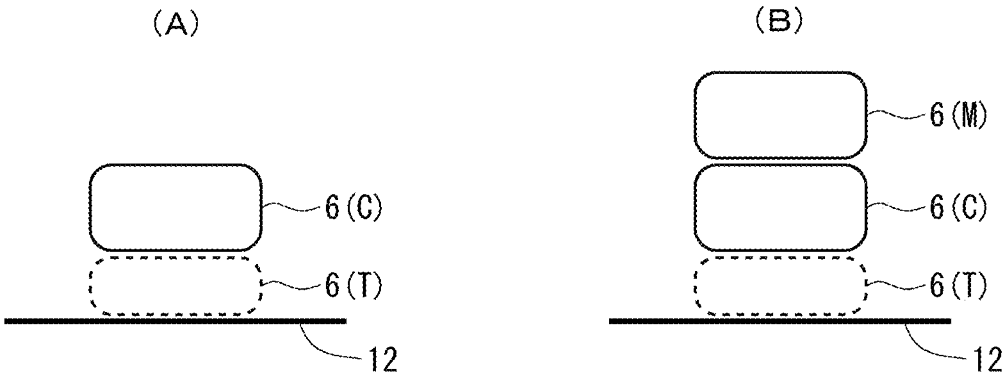
FIG. 13 consists of a diagram (A) describing ink ejection where transparent correction is performed on the single-color region in the first embodiment, and a diagram (B) describing ink ejection where transparent correction is performed on the mixed-color region in the first embodiment.

In the above example where the single-color region undergoes transparent correction, when transparent correction is performed, the transparent inkjet nozzles that correspond to the defect-adjacent nozzles initially eject transparent ink onto the (transparent) base material 12 during printing. Thereafter, the defect-adjacent nozzles eject cyan ink. That is, in the regions subjected to transparent correction, cyan ink 6(C) is ejected onto transparent ink 6(T) that has been ejected onto the base material 12, as schematically shown in (A) of FIG. 13.

It should be noted that in the case of transparent correction, as with white correction, the wetting spread range of the color ink (in the above example, cyan ink) on the base material 12 is larger when the color ink is ejected onto the transparent ink that has been ejected onto the base material 12 than when the color ink is ejected directly onto the base material 12. As described earlier, the wetting spread range refers to the area of a dot formed over the printing medium through ink ejection. Accordingly, the size of a dot formed through color ink ejection onto the base material 12 serving as the printing medium is larger when the color ink is ejected onto the transparent ink that has been ejected onto the base material 12 than when the color ink is ejected directly onto the base material 12 (see FIG. 9). Therefore, transparent ink is ejected in advance at positions where the defect-adjacent nozzles eject color inks onto the base material 12, resulting in the color inks ejected by the defect-adjacent nozzles spreading sufficiently on the base material 12 and enhancing the effect of nozzle-defect correction (i.e., suppressing the occurrence of image defects due to the defective nozzle and thereby preventing reduced printing quality).

Furthermore, in the present embodiment, when transparent correction is performed, resulting in transparent ink being ejected into a target region, the UV-LED array 159(*a*) is either disabled from ultraviolet irradiation or allowed to perform ultraviolet irradiation on the transparent ink at a reduced intensity. Applying no ultraviolet irradiation or weak ultraviolet irradiation to the transparent ink, as described above, increases the wetting spread range of the transparent ink and effectively increases the wetting spread ranges of the color inks ejected onto the transparent ink.

In the above example where the mixed-color region undergoes transparent correction, when transparent correction is performed, the transparent inkjet nozzles 514 and 515, which correspond to the defect-adjacent nozzles, initially eject transparent ink onto the base material 12 during printing. Thereafter, the defect-adjacent nozzles 512 and 513 in the cyan inkjet head 150(C) eject cyan ink, followed by the defect-adjacent nozzles 509 and 510 in the magenta inkjet head 150(M) ejecting magenta ink. That is, in the regions subjected to transparent correction, cyan ink 6(C) is ejected onto transparent ink 6(T) that has been ejected onto the base material 12, and then magenta ink 6(M) is ejected onto the cyan ink 6(C), as schematically shown in (B) of FIG. 13.

<1.7 Density Correction>

The inkjet printing apparatus 10 according to the present embodiment performs white correction and transparent correction, as described above, in addition to the conventionally performed density uniformity correction and nozzle-defect correction. The term "density correction" herein refers to the entire process encompassing density uniformity correction, nozzle-defect correction, white correction, and transparent correction. The print controller 200 executes the printing control program P to implement a density correction process section 24, which is a functional component for executing density correction. Note that either white or transparent correction is exclusively selected depending on the type of base material 12 used for printing (i.e., whether the base material is white or not).

<1.7.1 Functional Configuration>

Figure 14:
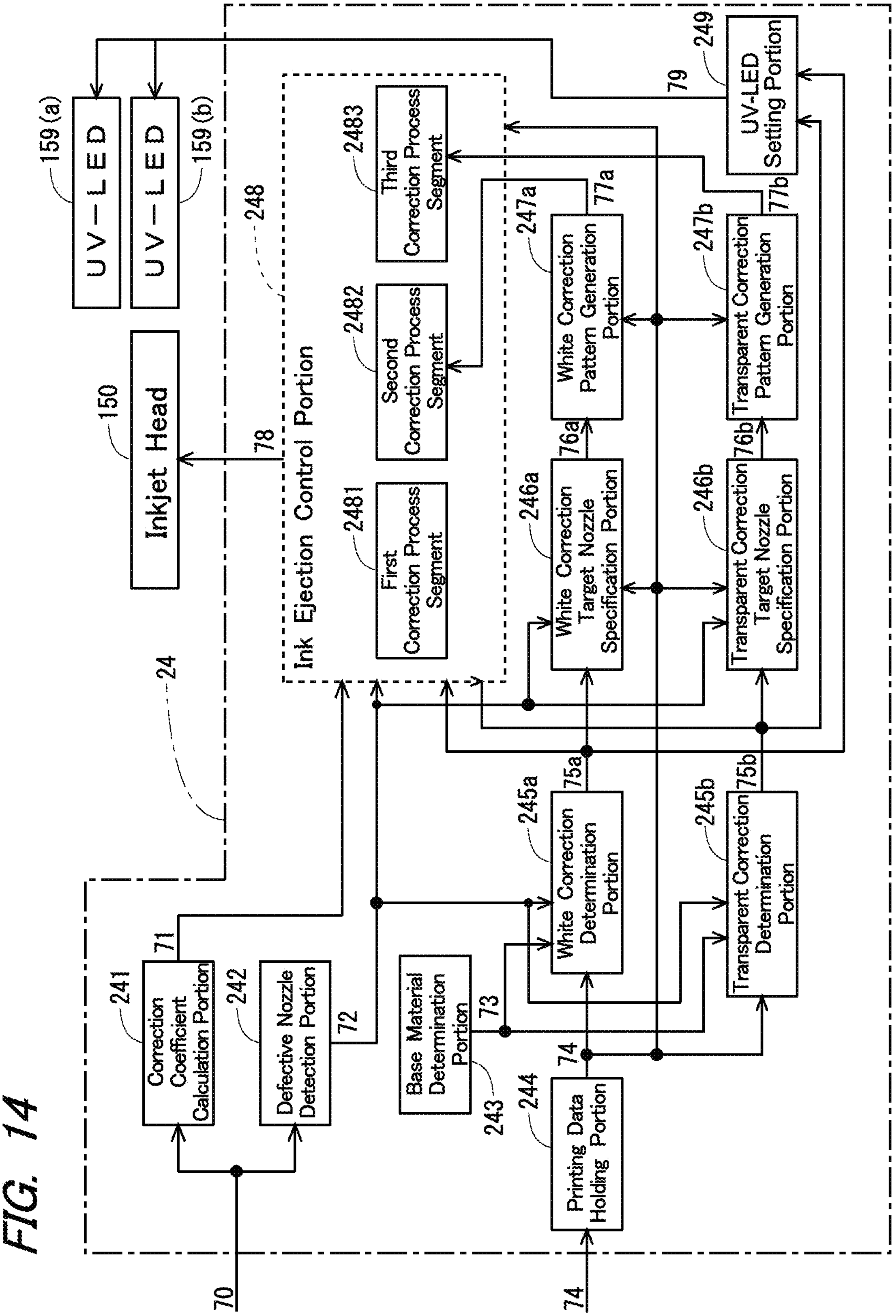
FIG. 14 is a block diagram illustrating in detail the functional configuration of a density correction process section in the first embodiment.

FIG. 14 is a block diagram illustrating in detail the functional configuration of the density correction process section 24 in the present embodiment. As shown in FIG. 14, the density correction process section 24 includes a correction coefficient calculation portion 241, a defective nozzle detection portion 242, a base material determination portion 243, a printing data holding portion 244 (for example, implemented using "image memory"), a white correction determination portion 245*a*, a white correction target nozzle specification portion 246*a*, a white correction pattern generation portion 247*a*, a transparent correction determination portion 245*b*, a transparent correction target nozzle specification portion 246*b*, a transparent correction pattern generation portion 247*b*, an ink ejection control portion 248, and a UV-LED setting portion 249. The ink ejection control portion 248 includes a first correction process segment 2481, a second correction process segment 2482, and a third correction process segment 2483.

The correction coefficient calculation portion 241 is configured to calculate a correction coefficient 71 for executing density uniformity correction, based on imaging data 70 obtained by the imaging portion 16 capturing a printed image of the aforementioned inspection chart. For example, when a nozzle ejects ink, resulting in a density of 4/5 of the intended density, the correction coefficient 71 for the nozzle is set at 1.25.

The defective nozzle detection portion 242 is configured to detect a defective nozzle in ejection failure from among the numerous nozzles in the color inkjet head 150 based on the imaging data 70. The defective nozzle detection portion 242 then outputs defective nozzle information 72 specifying the defective nozzle. Note that when no defective nozzle is detected, only density uniformity correction is performed by the first correction process segment 2481 in the ink ejection control portion 248.

The base material determination portion 243 is configured to determine the type of base material to be used for printing as the printing medium, based on, for example, printing conditions being set. The base material determination portion 243 then outputs base material information 73 specifying the base material.

The printing data holding portion 244 is configured to temporary hold (RIP-processed) printing data 74 transmitted by the printing data generation device 30. Note that the printing data holding portion 244 is implemented by the hardware memory 212 (see FIG. 6).

The white correction determination portion 245*a* is configured to determine whether to execute white correction, based on the defective nozzle information 72, the base material information 73, and the printing data 74. The white correction determination portion 245*a* then outputs a determination result 75*a*. To be specific on this, in the present embodiment, white correction is determined not to be executed when the base material information 73 indicates that the base material used for printing is not white. Additionally, white correction is determined to be executed when the defective nozzle information 72 and the printing data 74 indicate that there is a defective nozzle and the region where the defective nozzle and neighboring nozzles eject ink includes a portion that undergoes single-color high-density printing using ink of the single color that should be ejected through the defective nozzle, more specifically, printing with the total area coverage (i.e., the amount of ink of the single color) higher than the first determination criterion value.

Furthermore, white correction is determined to be executed when there is a defective nozzle and the region where the defective nozzle and neighboring nozzles eject ink includes a portion that undergoes mixed-color high-density printing using two or more color inks including the color ink to be ejected from the defective nozzle (i.e., ink of the defective nozzle color) with the defective nozzle color being at a high density, more specifically mixed-color high-density printing with the total area coverage higher than the second determination criterion value and with the defective nozzle ink amount percentage (i.e., the percentage of the amount of ink of the defective nozzle color relative to the total area coverage) higher than the third determination criterion value.

In other words, white correction is determined not to be executed even when there is a defective nozzle, if the region where the defective nozzle and neighboring nozzles eject ink includes neither a portion that undergoes single-color high-density printing using ink of the color that should be ejected through the defective nozzle (i.e., ink of the defective nozzle color) nor a portion that undergoes mixed-color high-density printing using two or more color inks, including the ink of the defective nozzle color, with a high defective nozzle ink amount percentage. In this manner, white correction is applied only to the region where the image defects caused by the presence of the defective nozzle are not sufficiently rectified by normal nozzle-defect thereby minimizing unnecessary correction, white ink consumption.

The white correction target nozzle specification portion 246*a* is configured to specify nozzles for ejecting white ink for white correction (referred to below as "white correction target nozzles") when the determination result 75*a* outputted by the white correction determination portion 245*a* indicates that white correction should be executed. The white correction target nozzle specification portion 246*a* selects the white correction target nozzles from among the numerous nozzles in the white inkjet head 150(W) based on the defective nozzle information 72 and the printing data 74. The white correction target nozzle specification portion 246*a* then outputs white correction target nozzle information 76*a* specifying the white correction target nozzles.

Figure 15:
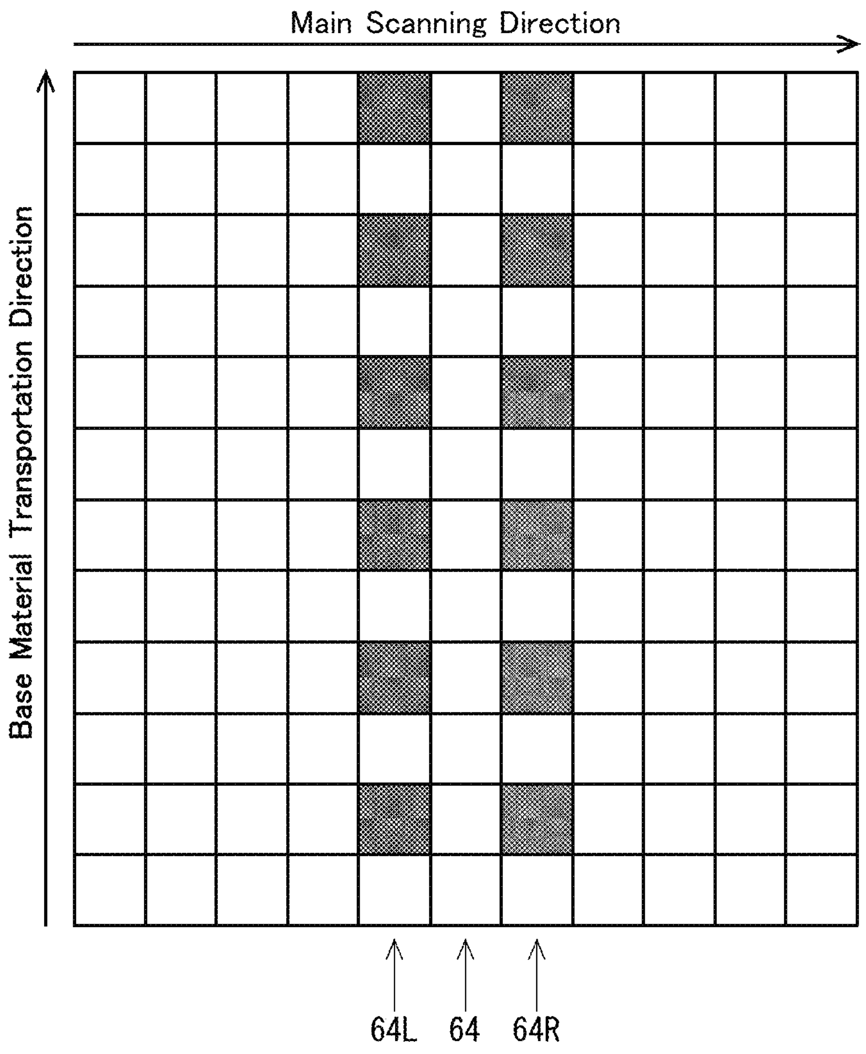
FIG. 15 is a diagram illustrating an example of a template for white correction in the first embodiment.

Incidentally, in the present embodiment, templates are prepared for white correction to indicate patterns in which white ink is ejected at pixels within a printing area. These templates are referenced by the white correction target nozzle specification portion 246*a* and the white correction pattern generation portion 247*a*. FIG. 15 shows an example of such prepared templates. In FIG. 15, reference numeral 64 denotes a column of pixels corresponding to the defective nozzle, while the hatched pixels are targeted for white ink ejection. Note that in the main scanning direction, each nozzle corresponds to only one pixel. In the example shown in FIG. 15, these hatched pixels are included in the columns denoted by reference numerals 64L and 64R. Accordingly, among the numerous nozzles in the white inkjet head 150(W), the nozzles that eject ink in the columns of pixels denoted by reference numerals 64L and 64R are specified as correction target nozzles by the white correction target nozzle specification portion 246*a*.

The white correction pattern generation portion 247*a* is configured to generate a white correction pattern 77*a* for the entire printing area, as exemplified by the above template, based on the white correction target nozzle information 76*a* and the printing data 74. In the present embodiment, the region where white ink should be ejected in accordance with the white correction pattern 77*a* is treated as a correction region. In the following, a region that should be corrected using white ink in a printed image formed on the base material 12 based on the printing data 74 is treated as a correction region, which includes the region where white ink should be ejected in accordance with the white correction pattern 77*a*. More specifically, this correction region includes a region where the defective nozzle should eject ink (i.e., a region with an image defect) and neighboring regions where white ink should be ejected to compensate for the image defect (this correction region will also be referred to as a "white correction region" to be distinguished from a transparent correction region, which will be described later). Accordingly, generating the white correction pattern 77*a* corresponds to determining the correction region.

Figure 16:
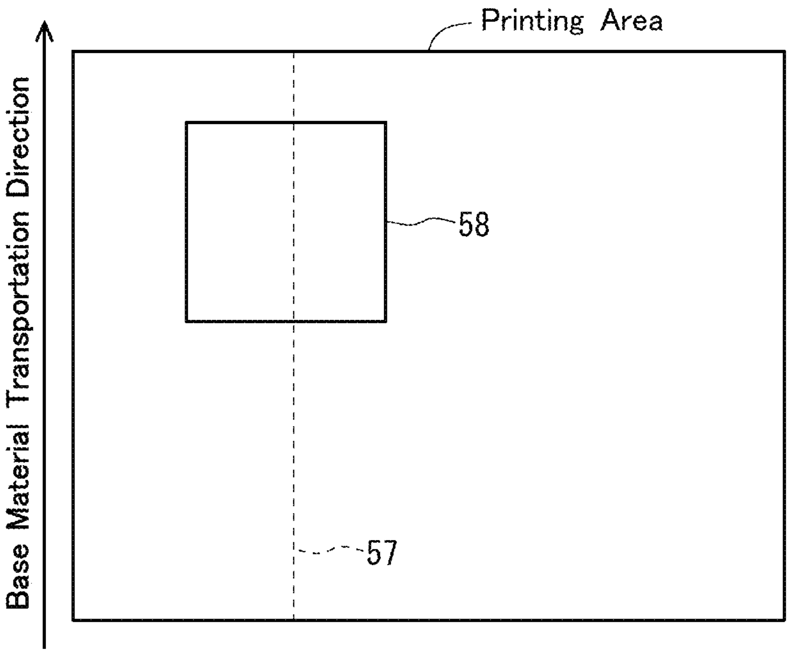
FIG. 16 is a diagram describing generation of a correction pattern in the first embodiment.
Figure 17:
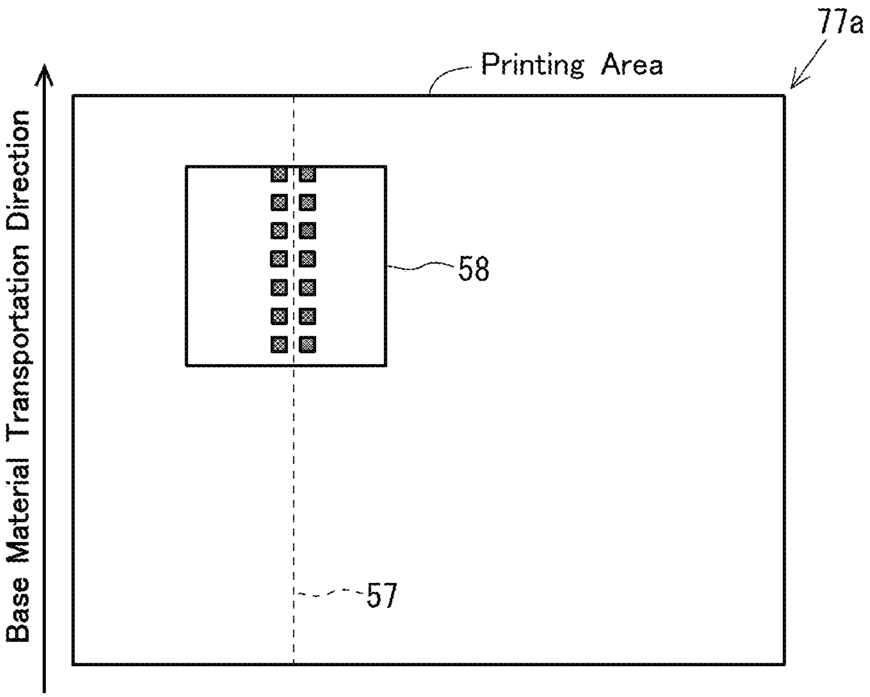
FIG. 17 is another diagram describing the generation of the correction pattern in the first embodiment.

As described above, in the present embodiment, white correction is performed on both the region that undergoes single-color high-density printing and the region that undergoes mixed-color high-density printing (i.e., printing with a high total area coverage) with a high defective nozzle ink amount percentage. For example, in FIG. 16, it is assumed that the cyan inkjet nozzle that ejects ink as indicated by the dotted line denoted by reference numeral 57 is a defective nozzle and the rectangular area denoted by reference numeral 58 undergoes single-color high-density printing using cyan ink. In this case, the white correction pattern generation portion 247*a* generates the white correction pattern 77*a* as shown in FIG. 17 such that white correction is applied only to the portion that should be subjected white correction within the region that undergoes single-color high-density printing using cyan ink. Note that in the case where white correction is performed on the region that undergoes mixed-color high-density printing with a high defective nozzle ink amount percentage, the white correction pattern 77*a* shown in FIG. 17 is also used such that white correction is applied only to the portion that should be subjected to white correction within the region. However, for the sake of convenience, the white correction pattern 77*a* will be described below, taking as an example only the case where white correction is performed on the region that undergoes single-color high-density printing.

The transparent correction determination portion 245*b* is configured to determine whether to execute transparent correction based on the defective nozzle information 72, the base material information 73, and the printing data 74. The transparent correction determination portion 245*b* then outputs a determination result 75*b*. To be specific on this, in the present embodiment, transparent correction is determined not to be executed when the base material information 73 indicates that the base material used for printing is white.

Furthermore, the transparent correction determination portion 245*b* determines to execute transparent correction when the defective nozzle information 72 and the printing data 74 indicate that there is a defective nozzle and the region where the defective nozzle and neighboring nozzles eject ink includes a portion that undergoes single-color high-density printing using ink of the single color that should be ejected by the defective nozzle, more specifically single-color high-density printing with the total area coverage (i.e., the amount of ink of the single color) higher than a first determination criterion value for transparent correction, which corresponds to the first determination criterion value used by the white correction determination portion 245*a*. Moreover, the transparent correction determination portion 245*b* determines to execute transparent correction when there is a defective nozzle and the region where the defective nozzle and neighboring nozzles eject ink includes a portion that undergoes mixed-color high-density printing using two or more color inks including the color ink to be ejected from the defective nozzle (i.e., ink of the defective nozzle color) with the defective nozzle color being at a high density, more specifically mixed-color high-density printing with the total area coverage higher than a second determination criterion value for transparent correction and with the defective nozzle ink amount percentage (i.e., the percentage of the amount of ink of the defective nozzle color relative to the total area coverage) higher than a third determination criterion value for transparent correction. The second and third determination criterion values for transparent correction respectively correspond to the second and third determination criterion values used by the white correction determination portion 245*a*.

In other words, transparent correction is determined not to be executed even when there is a defective nozzle, if the region where the defective nozzle and neighboring nozzles eject ink includes neither a portion that undergoes single-color high-density printing using ink of the defective nozzle color nor a portion that undergoes mixed-color high-density printing using two or more color inks, including the ink of the defective nozzle color, with a high defective nozzle ink amount percentage. In this manner, transparent correction is applied only to the region where the image defects caused by the presence of the defective nozzle are not sufficiently rectified by normal nozzle-defect correction, thereby minimizing unnecessary transparent ink consumption. Note that the first, second, and third determination criterion values for transparent correction can be obtained in advance using a method similar to that described earlier (see FIGS. 10 and 11) for obtaining the first, second, and third determination criterion values used by the white correction determination portion 245*a*.

The transparent correction target nozzle specification portion 246*b* is configured to specify nozzles for ejecting transparent ink for transparent correction (referred to below as "transparent correction target nozzles") when the determination result 75*b* outputted by the transparent correction determination portion 245*b* indicates that transparent correction should be executed. The transparent correction target nozzle specification portion 246*b* selects the transparent correction target nozzles from among the numerous nozzles in the transparent inkjet head 150(E) based on the defective nozzle information 72 and the printing data 74. The transparent correction target nozzle specification portion 246*b* then outputs transparent correction target nozzle information 76*b* specifying the transparent correction target nozzles.

The transparent correction pattern generation portion 247*b* is configured to generate a transparent correction pattern 77*b* for the entire printing area, as exemplified by the aforementioned template, based on the transparent correction target nozzle information 76*b* and the printing data 74. In the present embodiment, the region where transparent ink should be ejected in accordance with the transparent correction pattern 77*b* is treated as a transparent correction region. In the following, a region that should be corrected using transparent ink in a printed image formed on the base material 12 based on the printing data 74 is treated as a transparent correction region, which includes the region where transparent ink should be ejected in accordance with the transparent correction pattern 77*b*. More specifically, this transparent correction region includes a region where the defective nozzle should eject ink (i.e., a region with an image defect) and neighboring regions where transparent ink should be ejected to compensate for the image defect (When there is no need to distinguish this transparent correction region from the previously mentioned white correction region, it is simply referred to as the "correction region"). Accordingly, generating the transparent correction pattern 77*b* corresponds to determining the transparent correction region.

The ink ejection control portion 248 is configured to correct density data included in the printing data 74, and control ink ejection from each inkjet head 150 based on the corrected density data 78, as can be appreciated from FIG. 14. The ink ejection control portion 248 includes the first, second, and third correction process segments 2481, 2482, and 2483, as described above. The first correction process segment 2481 performs the process of correcting the density data in the printing data 74 when the determination results 75*a* and 75*b*, respectively outputted by the white correction determination portion 245*a* and the transparent correction determination portion 245*b*, indicate that neither white correction nor transparent correction should be executed. If the determination result 75*a* indicates that white correction should be executed, the second correction process segment 2482 performs the process of correcting the density data in the printing data 74. If the determination result 75*b* indicates that transparent correction should be executed, the third correction process segment 2483 performs the process of correcting the density data in the printing data 74.

The first correction process segment 2481 is configured to perform density uniformity correction and nozzle-defect correction based on the correction coefficient 71, the defective nozzle information 72, and the printing data 74. This corrects the density data in the printing data 74, resulting in density data 78 serving as normal correction density data for controlling ink ejection from each inkjet head 150.

The second correction process segment 2482 is configured to perform density uniformity correction, nozzle-defect correction, and white correction based on the correction coefficient 71, the defective nozzle information 72, the correction pattern 77*a*, and the printing data 74. This corrects the density data in the printing data 74, resulting in density data 78 serving as white correction density data for controlling ink ejection from each inkjet head 150.

The third correction process segment 2483 is configured to perform density uniformity correction, nozzle-defect correction, and transparent correction based on the correction coefficient 71, the defective nozzle information 72, the transparent correction pattern 77*b*, and the printing data 74. This corrects the density data in the printing data 74, resulting in density data 78 serving as transparent correction density data for controlling ink ejection from each inkjet head 150.

Incidentally, the inkjet heads 150, such as the white inkjet head 150(W) and the transparent inkjet head 150(E), are capable of ejecting ink in different droplet sizes. Specifically, a piezo or piezoelectric element is provided for each nozzle in the inkjet heads 150, so that the droplet size of ink ejected through the nozzle can be changed by altering the voltage waveform of a drive signal applied to the piezo element. In the present embodiment, the second correction process segment 2482 performs density data correction such that white ink is ejected into the correction region in the smallest of the droplet sizes. That is, the ink ejection control portion 248 controls white ink ejection from the inkjet head 150(W) such that white ink is ejected into the correction region in the smallest of the droplet sizes. This prevents unnecessary white ink consumption when increasing the wetting spread ranges of color inks. However, white ink may be ejected into the correction region in droplet sizes other than the smallest. The ink ejection control portion 248 performs similar control for transparent ink ejection.

It should be noted that the time between ink ejection from the inkjet head 150 onto the base material 12 and curing through ultraviolet irradiation by the UV-LED array 159(*c*) varies from one color to another. Referring to FIG. 3, it can be appreciated that, for example, the time between black ink ejection from the inkjet head 150(K) onto the base material 12 and curing is noticeably shorter compared to blue ink ejected by the inkjet head 150(B). Therefore, when the droplet size of white ink ejected by the inkjet head 150(W) for white correction is kept constant, the wetting spread range of black ink is conceivably smaller compared to that of blue ink. Therefore, white ink ejection from the inkjet head 150(W) may be controlled such that the dot size of white ink increases as the distance between the UV-LED array 159(*c*) and the inkjet head 150 corresponding to the color ink that is to be ejected onto white ink in the white correction region decreases. For a similar reason, transparent ink ejection from the inkjet head 150(E) may be controlled such that the dot size of transparent ink increases as the distance between the UV-LED array 159(*c*) and the inkjet head 150 corresponding to the color ink that is to be ejected onto transparent ink in the transparent correction region decreases.

The UV-LED setting portion 249 is configured to control ultraviolet irradiation by the white ink UV-LED array 159(*b*) by providing the UV-LED array 159(*b*) with an ultraviolet irradiation control signal 79, based on the determination result 75*a* outputted by the white correction determination portion 245*a*. The UV-LED setting portion 249 also controls ultraviolet irradiation by the transparent ink UV-LED array 159(*a*) by providing the UV-LED array 159(*a*) with an ultraviolet irradiation control signal 79, based on the determination result 75*b* outputted by the transparent correction determination portion 245*b*. Specifically, when the determination result 75*a* indicates that white correction should be executed, the UV-LED setting portion 249 disables the UV-LED array 159(*b*) from performing ultraviolet irradiation. In addition, when the determination result 75*b* indicates that transparent correction should be executed, the UV-LED setting portion 249 disables the UV-LED array 159(*a*) from performing ultraviolet irradiation. Note that when the determination result 75*a* indicates that white correction should be executed, the UV-LED setting portion 249 may cause the UV-LED array 159(*b*) to perform ultraviolet irradiation at a reduced intensity. That is, the UV-LED array 159(*b*) is not necessarily disabled from performing ultraviolet irradiation on white ink, so long as the wetting spread range of color ink ejected onto white ink is sufficiently large. In this regard, the same applies to the UV-LED setting portion 249 disabling the UV-LED array 159(*a*) from performing ultraviolet irradiation when the determination result 75*b* indicates that transparent correction should be executed.

It should be noted that in the present embodiment, the calculation of the correction coefficient 71 by the correction coefficient calculation portion 241 and the identification of the defective nozzle by the defective nozzle detection portion 242 are performed based on the imaging data 70, but the present invention is not limited to this. In the case where the inkjet printing apparatus 10 is not equipped with the imaging portion 16, the calculation of the correction coefficient 71 and the identification of the defective nozzle may be performed by the operator visually inspecting a printed image of the inspection chart.

Furthermore, the base material determination portion 243 may be replaced by a component that allows the operator to input base material information 73, based on which the process (of determining whether to execute white correction) by the white correction determination portion 245*a* and the process (of determining whether to execute transparent correction) by the correction determination portion 245*b* are performed.

In the present embodiment, the white correction determination portion 245*a*, the white correction target nozzle specification portion 246*a*, the white correction pattern generation portion 247*a*, the transparent correction determination portion 245*b*, the transparent correction target nozzle specification portion 246*b*, and the transparent correction pattern generation portion 247$b$ collectively serve a correction region determination portion, while the UV-LED setting portion 249 serves as an ultraviolet irradiation control portion.

<1.7.2 Correction Pattern Templates>

Figure 18:
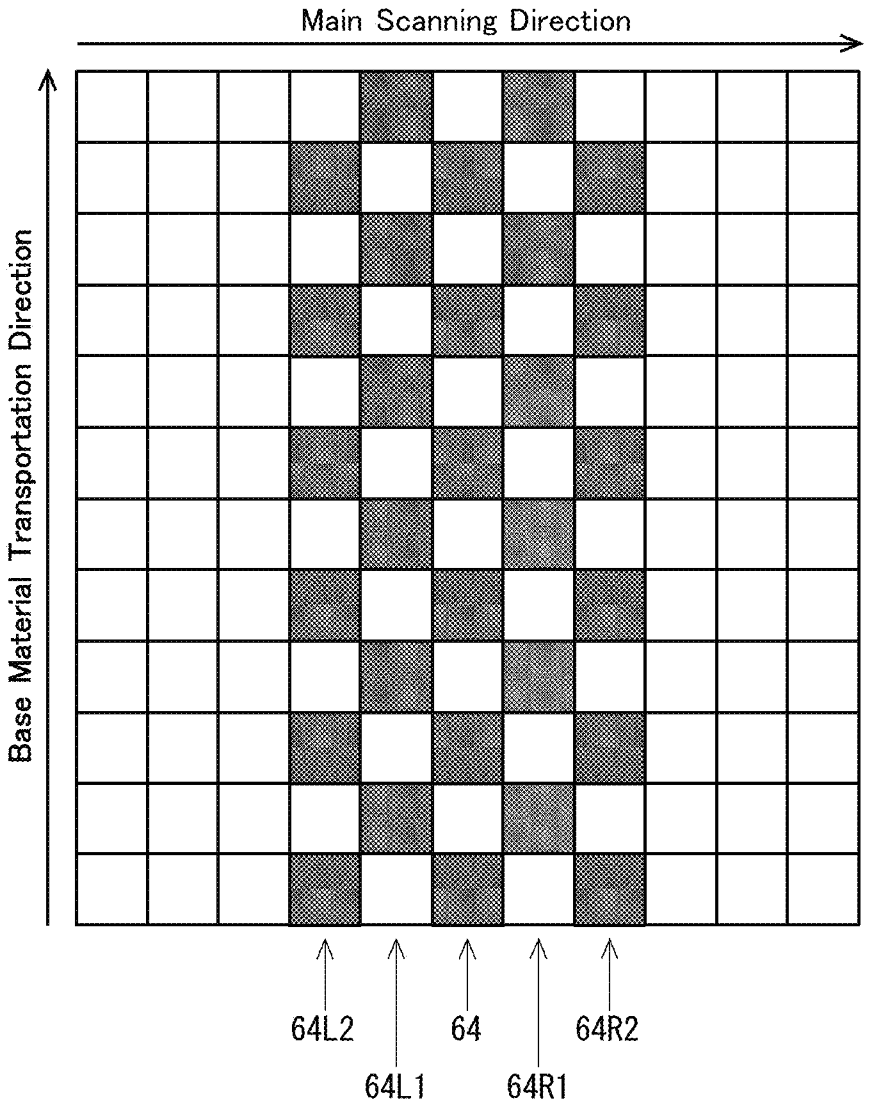
FIG. 18 is a diagram illustrating another example of the white correction template in the first embodiment.

The white correction pattern 77$a$ and the transparent correction pattern 77$b$ have been described above as being generated by the white correction pattern generation portion 247$a$ and the transparent correction pattern generation portion 247$b$, respectively, based on the template prepared as shown in FIG. 15. However, compatible templates are not limited to that shown in FIG. 15. For example, templates shown in FIGS. 18, 19, and 20 can also be employed. Moreover, templates other than those shown in FIGS. 15 and 18 to 20 can also be employed. To reliably ensure error margins for printing positions and the wetting spread ranges for white and transparent corrections, it is preferable to perform white or transparent printing at ±2 pixels for the pixels corresponding to the defective nozzle and to perform color printing at ±1 pixel with increased ink. Therefore, the templates shown in FIGS. 18 and 20 are preferred. Note that the correction target nozzles are specified using the templates as described above, and these templates can be used for both white correction and transparent correction. However, for the sake of convenience, the templates will be described below only in the context of white correction.

Figure 19:
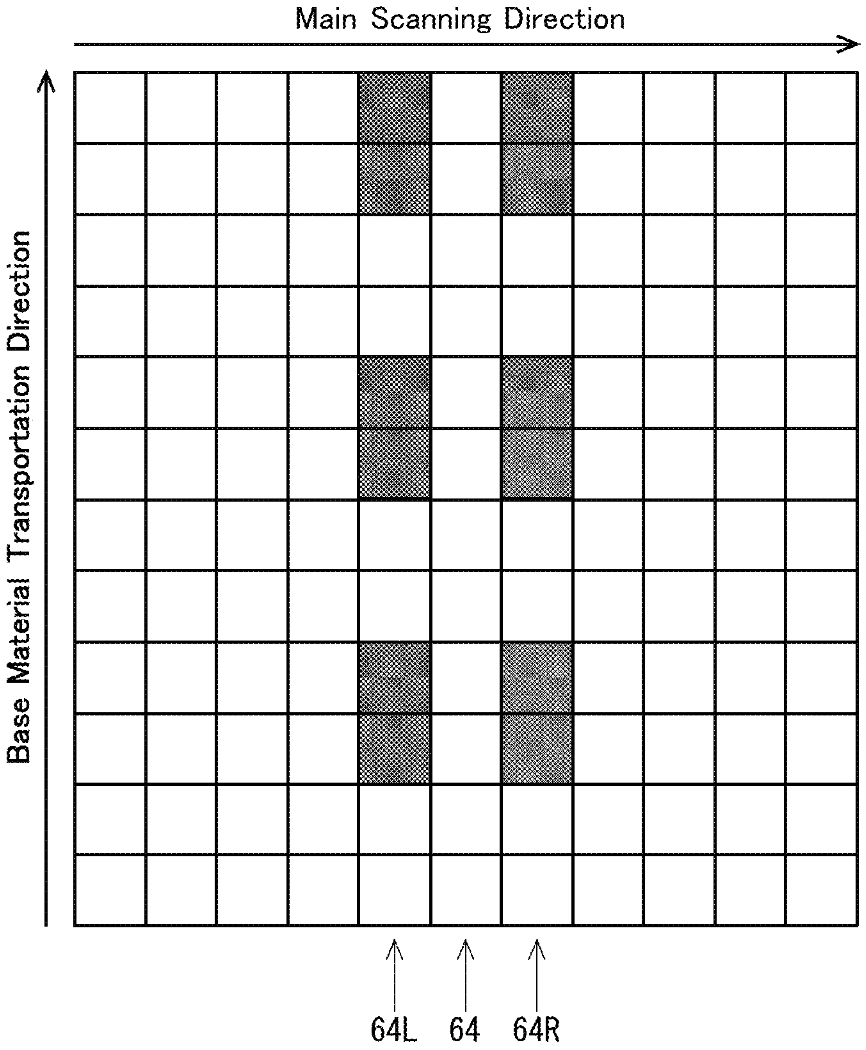
FIG. 19 is a diagram illustrating still another example of the white correction template e first embodiment.
Figure 20:
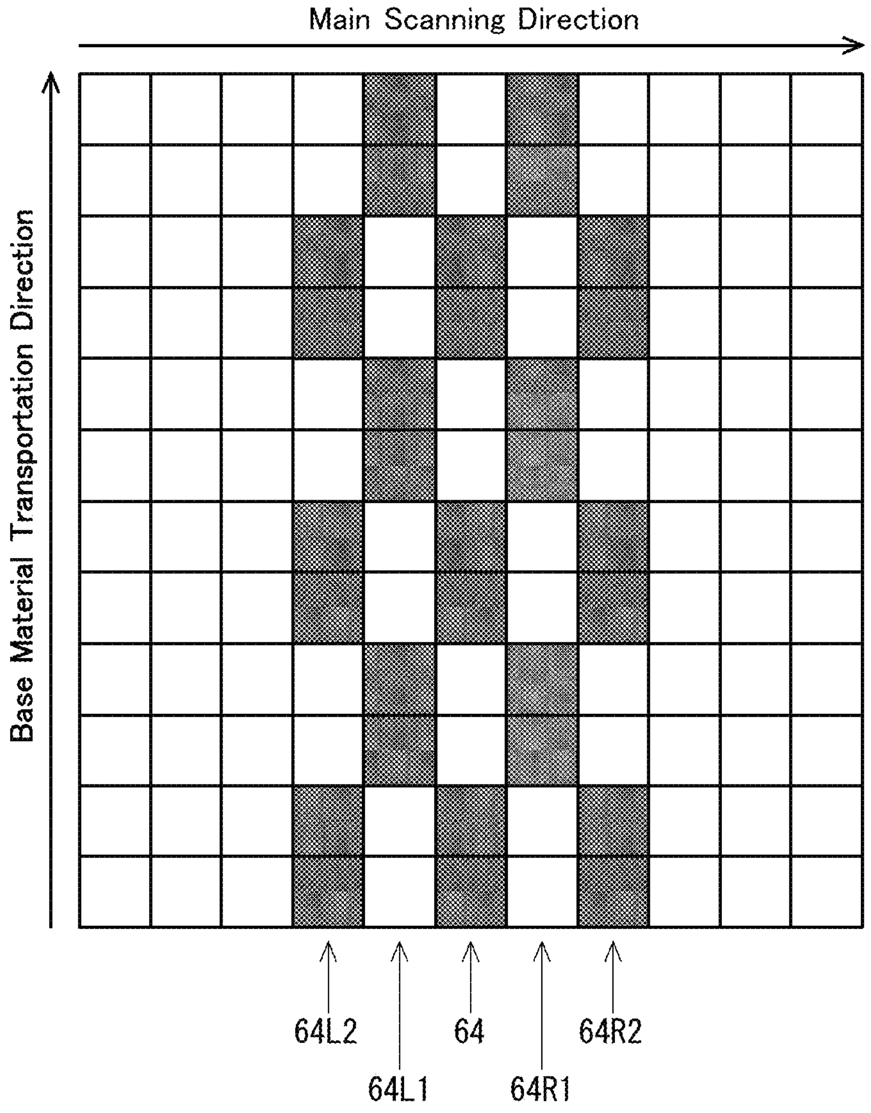
FIG. 20 is a diagram showing yet another example of the white correction template in the first embodiment.

When the template shown in FIG. 15 or 19 is employed, the nozzles that eject ink at pixels in the columns denoted by reference numerals 64L and 64R are specified as white correction target nozzles among the numerous nozzles in the white inkjet head 150(W). When the template shown in FIG. 18 or 20 is employed, the nozzles that eject ink at pixels in the columns denoted by reference numerals 64, 64L1, 64R1, 64L2, and 64R2 are specified as white correction target nozzles among the numerous nozzles in the white inkjet head 150(W).

Furthermore, when viewed in the transportation direction of the base material 12, the pixels where white ink is ejected alternate with those where white ink is not ejected. If the template shown in FIG. 15 or 18 is employed, the pixels alternate one after the other. If the template shown in FIG. 19 or 20 is employed, two pixels of one type alternate with two pixels of the other type.

<1.7.3 Procedure>

The procedure for density correction in the present embodiment will be described below with reference to FIG. 21. Note that the process target printing data 74 to be processed is assumed to already be held in the printing data holding portion 244 (see FIG. 14).

Figure 21:
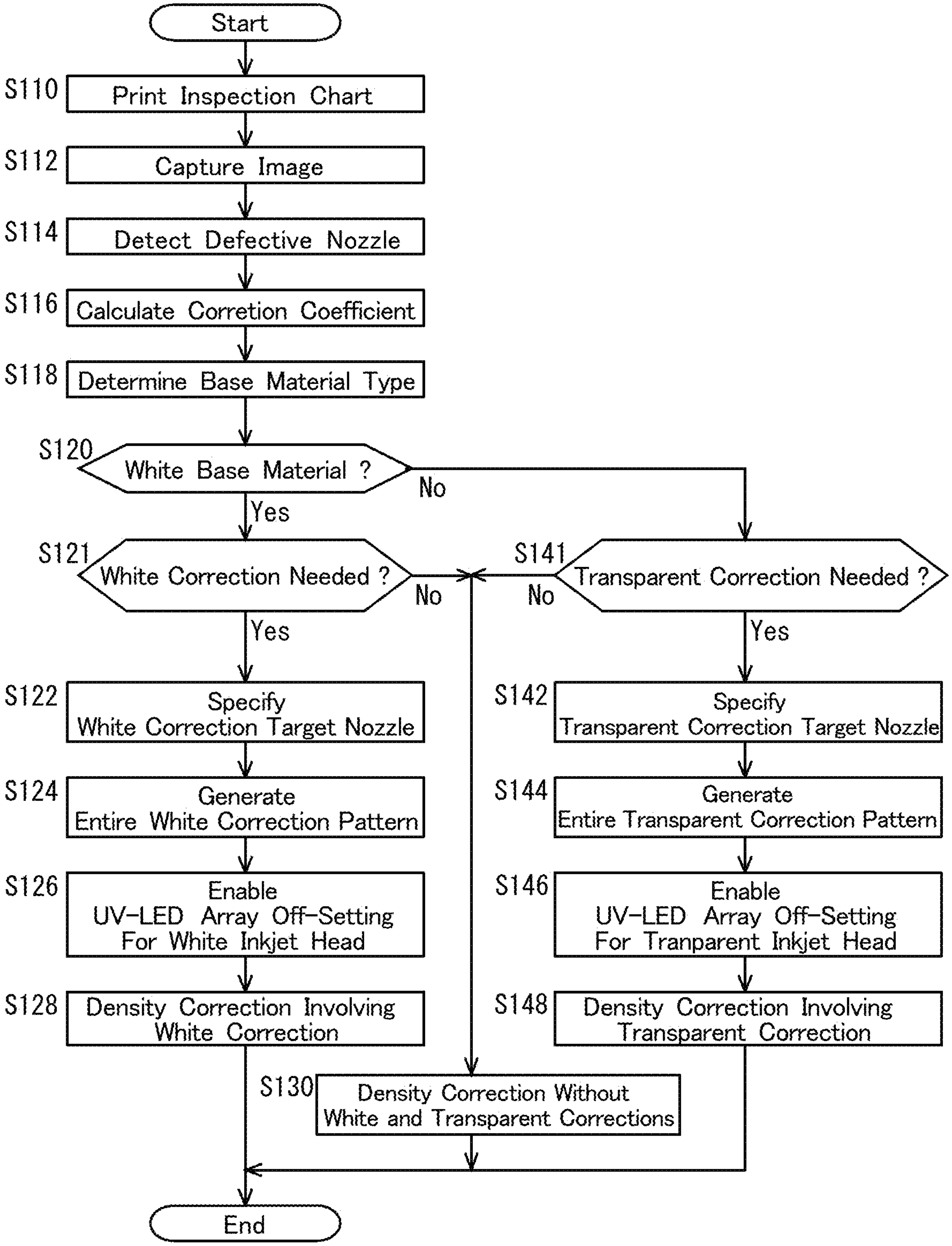
FIG. 21 is a flowchart describing the procedure for density correction in the first embodiment.

In the present embodiment, the main part of the density correction process section 24 shown in FIG. 14 (excluding the components implemented by hardware) are implemented through software by the CPU 211 in the print controller 200 shown in FIG. 6 performing the density correction process described in the procedure shown in FIG. 21, in accordance with the printing control program P. In the density correction process, the CPU 211 operates as described below.

After the density correction process is started, the recording portion 15 and the transportation portion are initially controlled to print an inspection chart for checking the state of the nozzles in the color inkjet heads 150 (specifically, the blue, orange, cyan, magenta, yellow, and black inkjet heads 150(B), 150(O), 150(C), 150(M), 150(Y), and 150(K)) (step S110). Then, the CPU 211 causes the imaging portion 16 to capture the resultant printed image of the inspection chart (step S112) and output imaging data 70.

Thereafter, based on the imaging data 70, a detection is made to determine whether the numerous nozzles in the color inkjet heads 150 include any defective nozzles (step S114). Next, based on the imaging data 70, a correction coefficient 71 for density uniformity correction is calculated (step S116).

After the calculation of the correction coefficient 71, the type of base material used for printing (i.e., the type of printing medium) is determined based on, for example, printing conditions being set, and base material information 73 specifying the base material is generated (step S118). Then, it is determined whether the base material is white based on the base material information 73 (step S120). When the base material is determined to be white, the process advances to step S121, and when the determination indicates otherwise, the process advances to step S141.

At step S121, the necessity of executing white correction is determined based on the printing data 74 and details of the defective nozzle detection from step S114 (i.e., defective nozzle information 72 as described earlier). Specifically, when the defective nozzle information 72 indicates that there is no defective nozzle, it is determined not to perform white correction. Conversely, when there is a defective nozzle, the necessity of executing white correction is determined based on the defective nozzle information 72 and the printing data 74, as described below.

Specifically, when the amount of ink for printing in a region where the defective nozzle and neighboring nozzles eject ink onto the base material 12 (referred to below as a "determination target region") satisfies the following expressions (1a) and (1b) or expressions (2a) and (2b), white correction is determined to be executed, and when the determination indicates otherwise (either expression (1a) or (1b) is not satisfied as well as either expression (2a) or (2b) is not satisfied), white correction is determined not to be executed.

$$IA(C)+IA(M)+IA(Y)+IA(K)+IA(O)+IA(B)>CR1 \tag{1a}$$

$$IA(Z)/\{IA(C)+IA(M)+IA(Y)+IA(K)+IA(O)+IA(B)\}=1 \tag{1b}$$

$$IA(C)+IA(M)+IA(Y)+IA(K)+IA(O)+IA(B)>CR2 \tag{2a}$$

$$1>IA(Z)/\{IA(C)+IA(M)+IA(Y)+IA(K)+IA(O)+IA(B)\}>CR3 \tag{2b}$$

In the above expressions, IA(C), IA(M), IA(Y), IA(K), IA(O), and IA(B) indicate ink amounts of cyan, magenta, yellow, black, orange, and blue, respectively, represented as percentages, with the maximum ink amount per pixel being 100% for each color. Moreover, the letter Z denotes the color of ink, C, M, Y, K, O, or B, that should be ejected into the determination target region by the defective nozzle. Accordingly, IA(Z) indicates the ink amount that should be ejected into the determination target region by the defective nozzle. Moreover, in the above expressions, CR1, CR2, and CR3 indicate the first, second, and third determination criterion values, respectively, determined in advance as described earlier (see FIGS. 10 and 11). In the present embodiment, these determination criterion values are as follows:

$$CR1=60,\ CR2=90,\ CR3=0.6 \tag{3}$$

In the present embodiment, the recording portion 150 includes the inkjet heads 150(O) and 150(B), which eject ink of the spot colors orange and blue, respectively, as shown in FIG. 3, in addition to the inkjet heads 150(C), 150(M), 150(Y), and 150(K), which eject ink of the process colors cyan, magenta, yellow, and black, but when the inkjet heads 150(O) and 150(B) for ejecting ink of the spot colors orange and blue are not included, the terms IA(O) and IA(B) in expressions (1a) to (2b) are omitted. Note that expressions (1a) and (1b) represent cases where the determination target region is a region where single-color high-density printing is performed using the color ink that should be ejected by the defective nozzle, while expressions (2a) and (2b) represent cases where the determination target region is a region where mixed-color high-density printing is performed using both the ink that should be ejected by the defective nozzle and another color ink.

When the determination made using expressions (1a) to (2b), provided as the determination result 75*a*, indicates that white correction needs to be executed, the process advances to step S122, and when otherwise indicated, the process advances to step S130. Note that when there is a defective nozzle but white correction is determined not to be executed, normal nozzle-defect correction is performed at step S130, as will be described later.

At step S122, based on the printing data 74 and the defective nozzle information 72, white correction target nozzles, as described earlier, are specified, resulting in generation of white correction target nozzle information 76*a*.

Next, based on the printing data 74 and details of the white correction target nozzles specified at step S122 (correction target nozzle information 76*a* as described earlier), a white correction pattern 77*a*, as described earlier, is generated (step S124). In other words, the white correction region, which is a region where white ink should be ejected to increase the wetting spread ranges of color inks over the base material 12, is determined.

After the white correction pattern 77*a* is generated, the white ink UV-LED array 159(*b*) is either disabled from ultraviolet irradiation or allowed to perform only weak ultraviolet irradiation based on the determination result 75*a* obtained at step S121 (step S126). Specifically, when white correction is performed, the UV-LED array 159(*b*) is either disabled from ultraviolet irradiation or allowed to perform only weak ultraviolet irradiation on the white ink ejected onto the base material 12 by the inkjet head 150(W), as described earlier.

Figure 37:
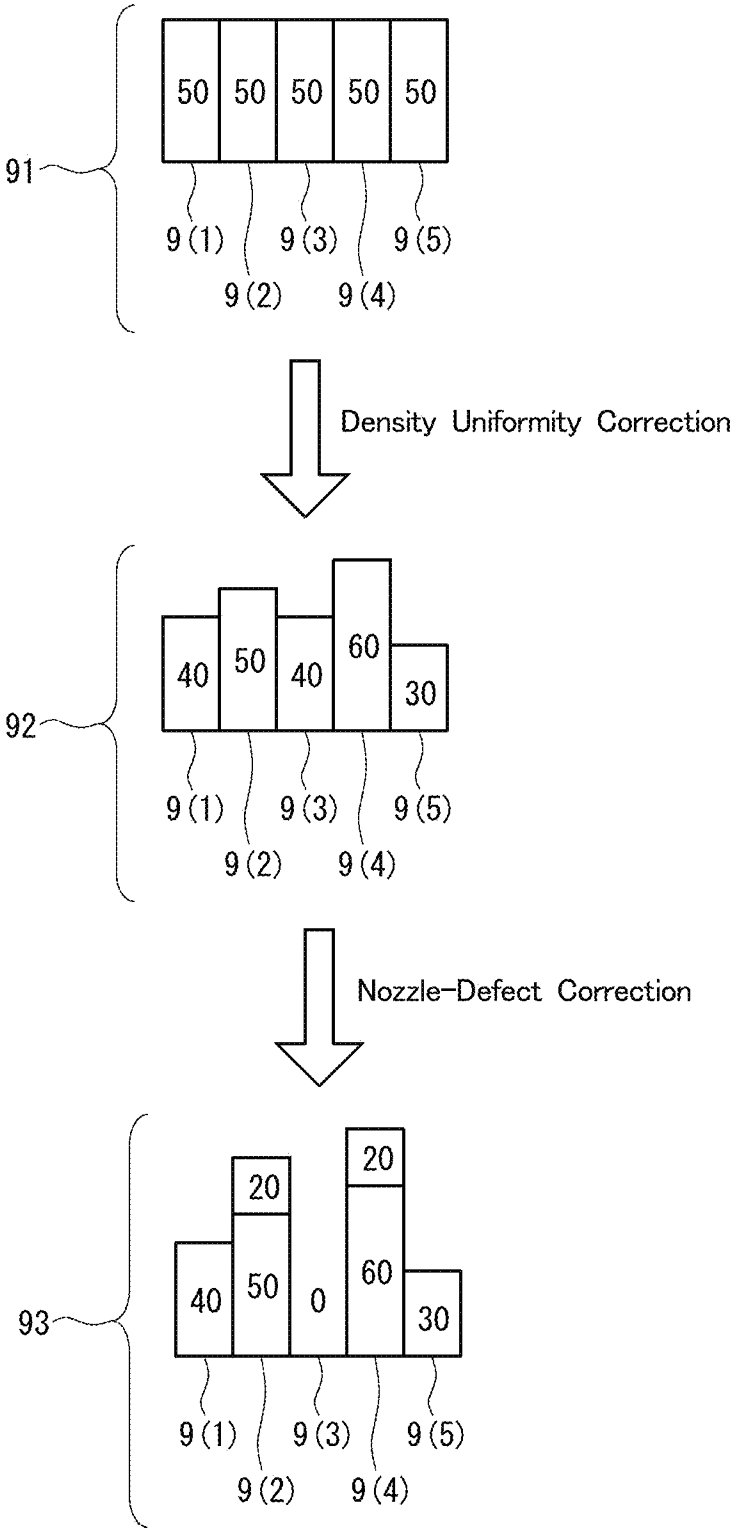
FIG. 37 is a diagram describing density uniformity correction and nozzle-defect correction in conventional example.

After the UV-LED array 159(*b*) is either disabled from ultraviolet irradiation or allowed to perform only weak ultraviolet irradiation, density uniformity correction, nozzle-defect correction, and white correction, as described earlier with reference to FIGS. 37, 7, and 8, respectively, are performed based on the correction coefficient 71 calculated at step S116, the defective nozzle information 72 obtained at step S114, the white correction pattern 77*a* generated at step S124, and the printing data 74 (step S128).

When the determination at step S120 indicates that the base material 12 used for printing is not white, the process advances to step S141, where it is determined whether transparent correction needs to be executed, based on the printing data 74 and the defective nozzle information 72. Specifically, when the defective nozzle information 72 indicates that there is no defective nozzle, transparent correction is determined not to be executed. When the defective nozzle information 72 indicates that there is a defective nozzle, similar to step S121 described above, the necessity for executing transparent correction is determined based on the defective nozzle information 72 and the printing data 74.

More specifically, transparent correction is determined to be executed when the amount of ink for printing in the region where the defective nozzle and neighboring nozzles eject ink (i.e., the determination target region) satisfies expressions (1a) and (1b) or expressions (2a) and (2b). When otherwise indicated, transparent correction is determined not to be executed. Note that the first, second, and third determination criterion values CR1, CR2, and CR3 in these expressions are obtained for transparent correction using a method similar to that described earlier for obtaining the first, second, and third determination criterion values (see FIGS. 10 and 11) used at step S121. That is, instead of using the method described earlier to form a white correction printed image based on corrected printing data resulting from white correction, corrected printing data resulting from transparent correction is used to form a transparent correction printed image, thereby determining in advance the first, second, and third determination criterion values CR1, CR2, and CR3 for transparent correction, which respectively correspond to the first, second, and third determination criterion values CR1, CR2, and CR3 used at step S121. At step S141, these first, second, and third determination criterion values CR1, CR2, and CR3 for transparent correction are used in expressions (1a) to (2b) to determine the necessity for executing transparent correction.

When the determination at step S141, provided as the determination result 75*b*, indicates that transparent correction needs to be executed, the process advances to step S142, and when otherwise indicated, the process advances to step S130.

At step S142, based on the printing data 74 and the defective nozzle information 72, transparent correction target nozzles are specified, resulting in generation of details of the correction target nozzles (referred to below as transparent correction target nozzle information 76*b*).

Next, based on the printing data 74 and the transparent correction target nozzle information 76*b*, a transparent correction pattern 77*b*, as described earlier, is generated (step S144). In other words, the transparent correction region, which is a region where transparent ink should be ejected to increase the wetting spread ranges of color inks over the base material 12, is determined.

After the transparent correction pattern 77*b* is generated, the transparent ink UV-LED array 159(*a*) is either disabled from ultraviolet irradiation or allowed to perform only weak ultraviolet irradiation based on the determination result 75*b* obtained at step S141 (step S146). Specifically, when transparent correction is performed, the UV-LED array 159(*a*) is either disabled from ultraviolet irradiation or allowed to perform only weak ultraviolet irradiation on the transparent ink ejected onto the base material 12 by the inkjet head 150(E), as described earlier.

After the UV-LED array 159(*a*) is either disabled from ultraviolet irradiation or allowed to perform only weak ultraviolet irradiation, density uniformity correction, nozzle-defect correction, and transparent correction, as described earlier, are performed based on the correction coefficient 71 calculated at step S116, the defective nozzle information 72 obtained at step S114, the transparent correction pattern 77*b* generated at step S144, and the printing data 74 (step S148).

When transparent correction is determined not to be executed, the process advances to step S130, similar to the case of white correction described earlier (see steps S121 and S141). At step S130, density uniformity correction and normal nozzle-defect correction are performed based on the defective nozzle information 72, the correction coefficient 71, and the printing data 74 (see FIG. 37).

The procedure for density correction ends with the processing at step S128, S130, or S148.

In the density correction process during which the CPU 211 operates as described above, step S114 implements the defective nozzle detection portion 242, step S116 implements the correction coefficient calculation portion 241, step S118 implements the base material determination portion 243, steps S120 and S121 implement the white correction determination portion 245*a*, step S122 implements the white correction target nozzle specification portion 246*a*, step S124 implements the white correction pattern generation portion 247*a*, steps S120 and S141 implement the transparent correction determination portion 245*b*, step S142 implements the transparent correction target nozzle specification portion 246*b*, step S144 implements the transparent correction pattern generation portion 247*b*, steps S126 and S146 implements the UV-LED portion 249, step S128 implements the second correction process segment 2482, step S148 implements the third correction process segment 2483, and step S130 implements the first correction process segment 2481 (see FIG. 14). Note that the ink ejection control portion 248 is implemented by a known process for controlling the recording portion 15 and the transportation portion to perform printing in accordance with the printing control program P, step S130 implementing the first correction process segment 2481, step S128 implementing the second correction process segment 2482, and step S148 implementing the third correction process segment 2483.

After performing the density correction process in the above procedure, the CPU 211 controls ink ejection from each inkjet head 150 and base material transportation by the transportation portion based on density data 78 obtained through the density correction process, in accordance with the printing control program P, thereby executing actual printing on the base material 12. At this time, as can be seen from FIG. 3, the ink ejection onto the base material 12 occurs in the following order: white ink, blue ink, orange ink, cyan ink, magenta ink, yellow ink, and black ink. For example, if a cyan inkjet nozzle is detected to be a defective nozzle, white ink is initially ejected into the white correction region on the base material 12, followed by ejection of cyan ink onto the white ink. In the case of the transparent correction region, transparent ink is initially ejected onto the base material 12, followed by ejection of cyan ink onto the transparent ink.

<1.8 Effects>

In the present embodiment, when the base material 12 used for printing is white, white correction (i.e., nozzle-defect correction using white ink) is performed in regions where nozzle-defect correction should be executed, and when the base material 12 is not white, transparent correction (i.e., nozzle-defect correction using transparent ink) is performed in regions where nozzle-defect correction should be executed (see FIG. 21). However, as can be appreciated from the foregoing, similar effects can be achieved regardless of whether white correction transparent correction is performed (see FIGS. 7, 8, 9, 12, 13, and 21). Therefore, the effects of the present embodiment will be described below, focusing only on white correction.

In the present embodiment, white correction is performed on density data such that white inkjet nozzles corresponding to defect-adjacent nozzles eject white ink in a portion that undergoes single-color high-density printing using color ink that should be ejected by a defective nozzle detected in the color inkjet head 150, within a region where the defective nozzle and neighboring nozzles eject ink onto the base material 12. Here, the wetting spread range of the color ink on the base material 12 is larger when the color ink is ejected onto white ink that has been ejected onto the base material 12 than when the color ink is ejected directly onto the base material 12. Accordingly, each inkjet head 150 ejects ink based on density data subjected to white correction, ensuring that the color ink spreads sufficiently on the base material 12 in the region targeted for white correction, thereby enhancing the effect of nozzle-defect correction (i.e., suppressing the occurrence of image defects caused by the defective nozzle and preventing reduced printing quality) compared to that conventionally achieved. That is, even when there is a defective nozzle corresponding to a region that undergoes single-color high-density printing, printed image quality reduction caused by the defective nozzle can be effectively mitigated.

Furthermore, when nozzle-defect correction should be performed in the region that undergoes single-color high-density printing, whether to perform normal nozzle-defect correction or white correction (nozzle-defect correction using white ink) is determined based on the determination criterion value established in advance for the total area coverage corresponding to the density of the single-color region (i.e., the first determination criterion value; see expressions (1a) and (1b)), with the result that suitable nozzle-defect correction is performed in accordance with the density of the printed image, minimizing unnecessary white ink consumption. Note that the color of the ink (i.e., white ink) used for increasing the wetting spread range of the color ink is the same as the color of the base material 12. Accordingly, the color of the ink ejected onto the base material 12 to increase the wetting spread range of the color ink is not noticeable on the printed image.

Furthermore, in the above embodiment, when nozzle-defect correction should be performed to suppress the occurrence of image defects caused by the defective nozzle in the mixed-color region, white correction is also performed if both the total area coverage corresponding to the density of the mixed-color region and the defective nozzle ink amount percentage are high. In this case, whether to perform normal nozzle-defect correction or white correction is determined based on the determination criterion value established in advance for the total area coverage (i.e., the second determination criterion value) and the determination criterion value established in advance for the defective nozzle ink amount percentage (i.e., the third determination criterion value) (see expressions (2a) and (2b) described earlier). For example, assuming there are determination target regions R1 to R6, which are defective image regions where defective nozzles and neighboring nozzles eject ink, ink amounts as shown in FIG. 22 are used for printing in the respective regions R1 to R6. For each of regions R1 to R6, FIG. 22 shows the amounts, total area coverages, and defective nozzle ink amount percentages for cyan (C), magenta (M), yellow (Y), and black (K) inks used for printing. Regions R1 and R2 are single-color regions printed with one color ink, while regions R3 to R6 are mixed-color regions printed with two or more color inks. In each of regions R1 to R6 shown in FIG. 22, the defective nozzle ejects cyan (C) ink, and the bottom row of the table in FIG. 22 shows determination results regarding the necessity of white correction, as obtained using expressions (1a) to (2b) described earlier, for regions R1 to R6. Effects obtained by determining the necessity of white correction for mixed-color regions R3 to R6, from among regions R1 to R6 shown in FIG. 22, will be described below with reference to FIGS. 23 to 26. Note that in FIGS. 23 to 26, image defects in regions R3 to R6 are enclosed by dotted lines. More specifically, FIGS. 23(A), 24(A), 25(A), and 26(A) show printed images obtained by printing using printing data subjected to normal nozzle-defect correction, while FIGS. 23(B), 24(B), 25(B), and 26(B) show printed images obtained by printing using printing data subjected to white correction. Moreover, for the sake of convenience, the printed images shown in FIGS. 23 to 26 are adjusted in hue and brightness compared to actual images.

Figure 23:
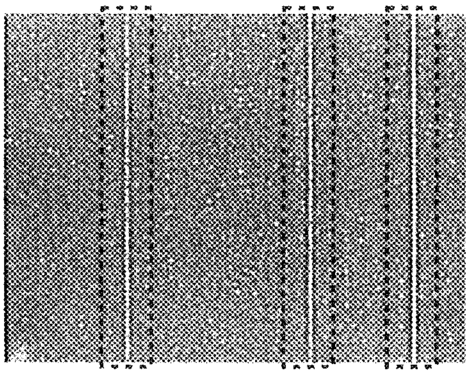
FIG. 23 consists of diagrams (A) and (B) describing effects achieved by determining the necessity of white correction for region R3 indicated in FIG. 22.
Figure 23:
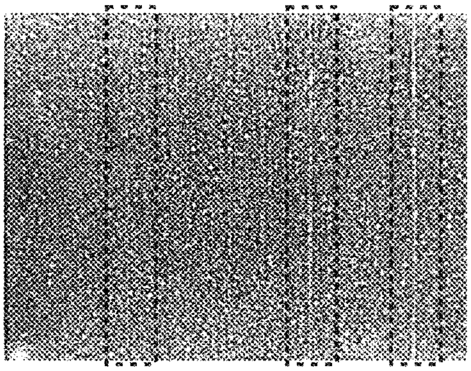

When printing is performed using printing data with region R3 subjected to normal nozzle-defect correction, image defects caused by the defective nozzles are not rectified, and density decreases due to dot missing appear as streaks, as shown in (A) of FIG. 23. When printing is performed using printing data with region R3 subjected to white correction, the image defects caused by the defective nozzles are rectified, as shown in (B) of FIG. 23. In the present embodiment, is determined to require white correction, as shown in FIG. 22.

Figure 24:
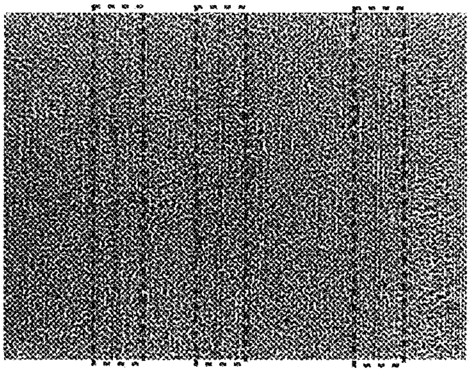
FIG. 24 consists of diagrams (A) and (B) describing effects achieved by determining the necessity of white correction for region R4 indicated in FIG. 22.
Figure 24:
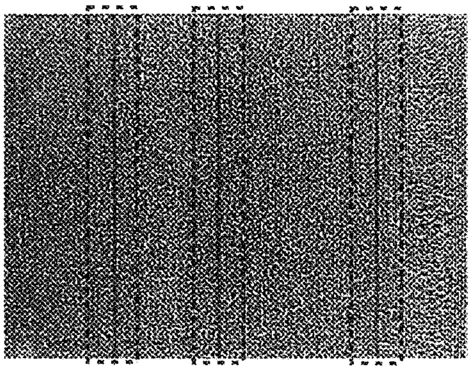

When printing is performed using printing data with region R4 subjected to normal nozzle-defect correction, image defects caused by the defective nozzles are rectified, as shown in (A) of FIG. 24. When printing is performed using printing data with region R4 subjected to white correction, density increases due to excessive correction appear as streaks, as shown in (B) of FIG. 24, and the image defects caused by the defective nozzles are not sufficiently rectified. In the present embodiment, region R4 is determined not to require white correction, as shown in FIG. 22.

Figure 25:
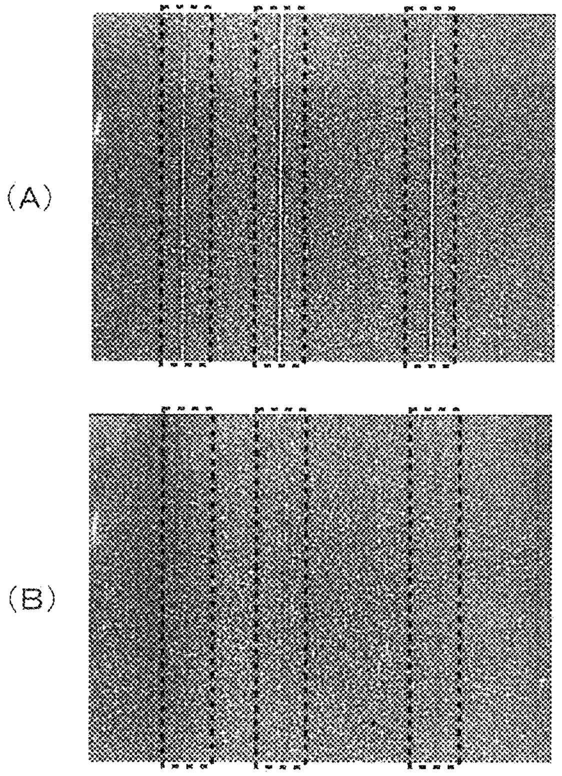
FIG. 25 consists of diagrams (A) and (B) describing effects achieved by determining the necessity of white correction for region R5 indicated in FIG. 22.

When printing is performed using printing data with region R5 subjected to normal nozzle-defect correction, image defects caused by the defective nozzles are not rectified, and density decreases due to dot missing appear as streaks, as shown in (A) of FIG. 25. When printing is performed using printing data with region R5 subjected to white correction, image defects caused by the defective nozzles are rectified, as shown in (B) of FIG. 25. In the present embodiment, region R5 is determined to require white correction, as shown in FIG. 22.

Figure 26:
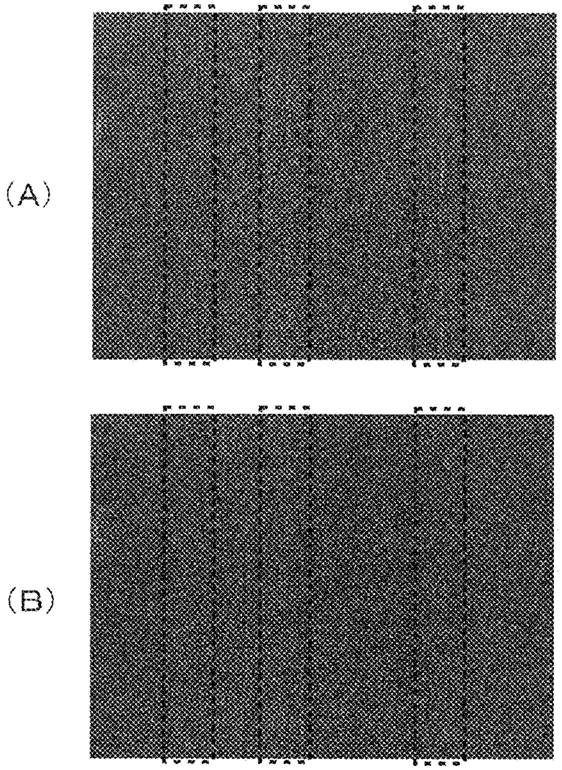
FIG. 26 consists of diagrams (A) and (B) describing effects achieved by determining the necessity of white correction for region R6 indicated in FIG. 22.

When printing is performed using printing data with region R6 subjected to normal nozzle-defect correction, image defects caused by the defective nozzles are mostly rectified, but density decreases due to dot missing slightly appear as streaks, as shown in (A) of FIG. 26. However, the figure is adjusted for brightness and other factors for ease of illustration, and therefore such density decreases, which slightly appear as streaks, are unlikely to cause any actual issues. On the other hand, when printing is performed using printing data with region R6 subjected to white correction, density increases due to excessive correction are expected to appear as streaks, but the actual image of region R6 is printed at a high density with low brightness (see FIG. 22), and therefore these density increases are not actually noticeable, as shown in (B) of FIG. 26. In the present embodiment, region R6 is determined not to require white correction, as shown in FIG. 22.

As can be appreciated from the foregoing, in the present embodiment, when nozzle-defect correction should be performed to suppress the occurrence of image defects caused by the defective nozzles in the mixed-color region, whether to execute normal nozzle-defect correction or white correction is selected based on the predetermined determination criterion values (see step S121 in FIG. 21, FIG. 22, and expressions (2a), (2b), and (3) described earlier), so that suitable nozzle-defect correction is performed in accordance with the total area coverage and the defective nozzle ink amount percentage. Thus, white correction is applied to the mixed-color region under appropriate conditions, enhancing the effect of nozzle-defect correction compared to conventional practices while avoiding excessive correction through white correction and unnecessary white ink consumption (see FIGS. 23(B), 24(A), 25(B), and 26(A)).

In the present embodiment, when nozzle-defect correction should be performed to suppress the occurrence of image defects caused by the defective nozzles in both the single-color and mixed-color regions, whether to perform normal nozzle-defect correction or white correction (or transparent correction if the base material is not white) is determined based on the predetermined determination criterion values, as described above, and therefore white correction (or transparent correction) is performed under appropriate conditions, allowing the inkjet printing apparatus 10 to produce high-quality print products. Moreover, the reduction in printed image quality caused by the defective nozzles can be appropriately and effectively mitigated, resulting in a reduced necessity of reprinting and reduced consumption of the base material and ink compared to conventional practices. This contributes to efforts in achieving sustainable development goals (SDGs).

<1.9 Variants>

<1.9.1 First Variant>

In the first embodiment, for regions that should undergo nozzle-defect correction, white correction (i.e., nozzle-defect correction using white ink) is performed when the base material 12 used for printing is white, while transparent correction (i.e., nozzle-defect correction using transparent ink) is performed when the base material 12 is not white (see FIG. 21). However, if it is unnecessary to consider cases where the base material 12 is not white, the components related to transparent correction in the first embodiment may be omitted. An inkjet printing apparatus that omits the transparent correction-related components in the first embodiment will be described below as a first variant of the first embodiment.

Figure 27:
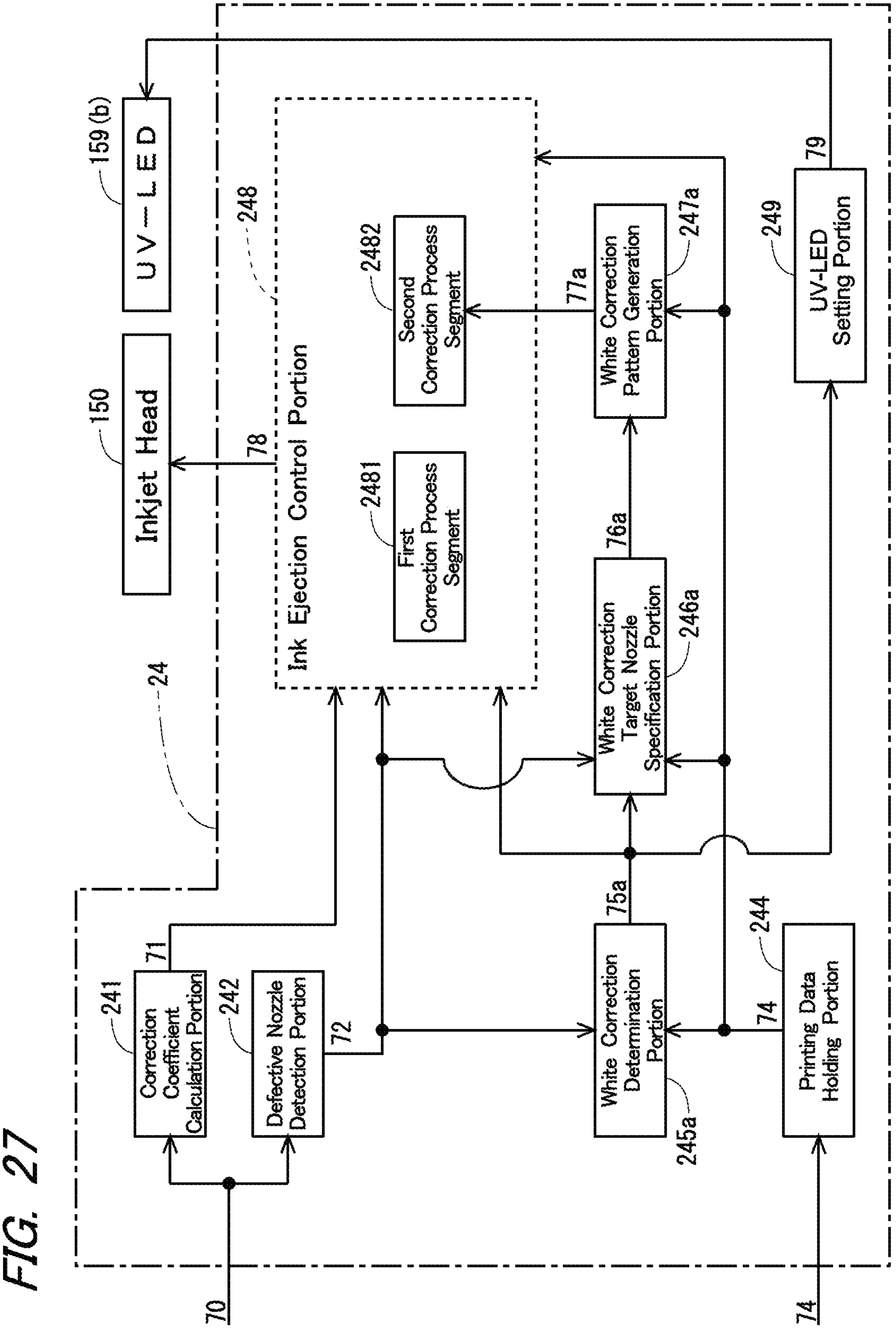
FIG. 27 is a block diagram illustrating in detail the functional configuration of a density correction process section in a first variant of the first embodiment.

In the present variant, the base material determination portion 243, the transparent correction determination portion 245*b*, the transparent correction target nozzle specification portion 246*b*, the transparent correction pattern generation portion 247*b*, and the third correction process segment 2483 are removed the functional configuration of the density correction process section 24 in the first embodiment shown in FIG. 14, and the UV-LED setting portion 249 is not required to control the UV-LED array 159(*a*). Therefore, in the present variant, the density correction process section 24 is configured as shown in FIG. 27. Moreover, in the present variant, steps S118, S120, and S141 to S148 are removed from the procedure for density correction (i.e., the density correction process) in the first embodiment shown in FIG. 21, resulting in the procedure shown in FIG. 28.

When the present variant, as described above, does not consider using base materials that are not white as printing media, whether to perform normal nozzle-defect correction or white correction is appropriately determined for both the single-color and mixed-color regions that should undergo nozzle-defect correction, based on predetermined determination criterion values, resulting in white correction under appropriate conditions and achieving similar effects to those in the first embodiment.

<1.9.2 Second Variant>

In the first embodiment, for regions that should undergo nozzle-defect correction, white correction (nozzle-defect correction using white ink) is performed when the base material 12 used for printing is white, while transparent correction (i.e., nozzle-defect correction using transparent ink) is performed when the base material 12 is not white (see FIG. 21). However, when it is not necessary to consider cases where the base material 12 is white, the components related to white correction in the first embodiment may be omitted. An inkjet printing apparatus that omits the white correction-related components in the first embodiment will be described below as a second variant of the first embodiment.

Figure 29:
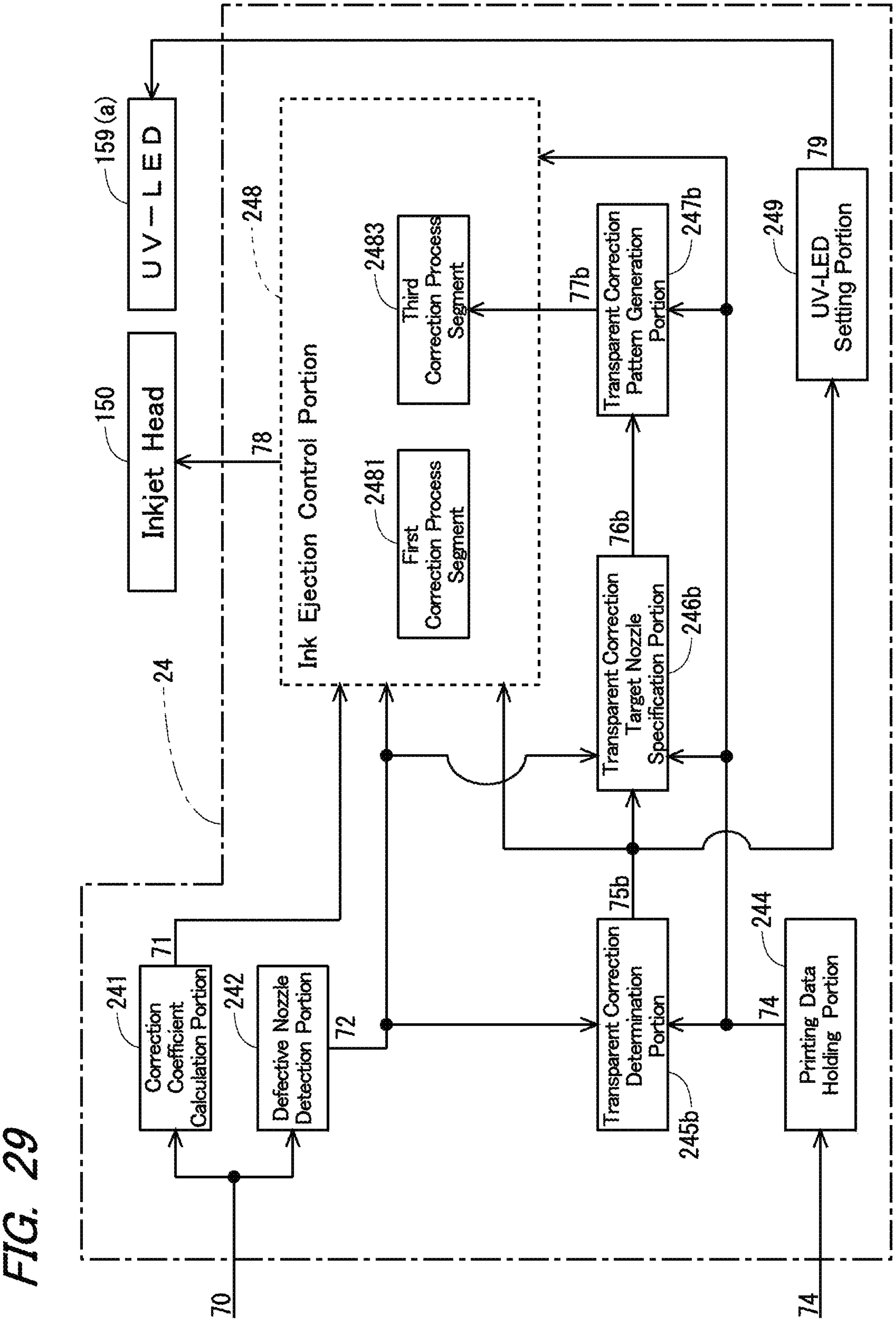
FIG. 29 is a block diagram illustrating in detail the functional configuration of a density correction process section in a second variant of the first embodiment.
Figure 30:
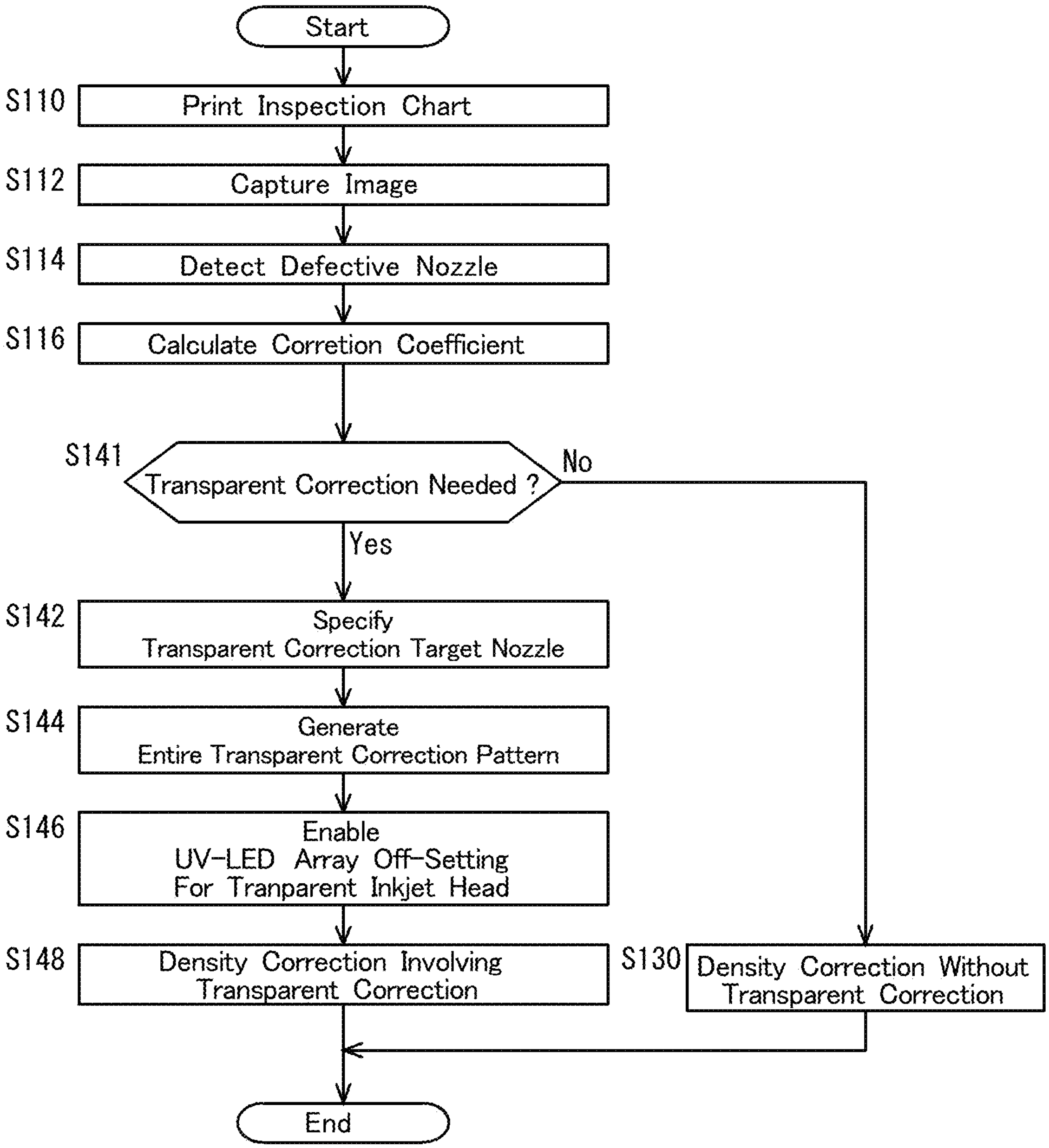
FIG. 30 is a flowchart describing the procedure for density correction in the second variant of the first embodiment.

In the present variant, the base material determination portion 243, the white correction determination portion 245*a*, the white correction target nozzle specification portion 246*a*, the white correction pattern generation portion 247*a*, and the second correction process segment 2482 are removed from the functional configuration of the density correction process section 24 in the first embodiment shown in FIG. 14, and the UV-LED setting portion 249 is not required to control the UV-LED array 159(*b*). Therefore, in the present variant, the density correction process section 24 is configured as shown in FIG. 29. Moreover, in the present variant, steps S118, S120, and S121 to S128 are removed from the procedure for density correction (i.e., the density correction process) in the first embodiment shown in FIG. 21, resulting in the procedure shown in FIG. 30.

When the present variant, as described above, does not consider using base materials that are white as printing media, whether to perform normal nozzle-defect correction or transparent correction is appropriately determined for both the single-color and mixed-color regions that should undergo nozzle-defect correction, based on predetermined determination criterion values, resulting in transparent correction under appropriate conditions and achieving similar effects to those in the first embodiment.

<1.9.3 Third Variant>

In the first embodiment, to increase the wetting spread ranges of color inks on the base material 12 through nozzle-defect correction, white or transparent ink is ejected onto the base material 12 in correction regions, depending on whether the base material 12 is white or not, before the color inks are ejected. However, the present invention is not limited to this. Accordingly, to increase the wetting spread ranges of the color inks, inks other than white and transparent inks may conceivably be used. Moreover, when a black inkjet nozzle is a defective nozzle, it is conceivable to use yellow ink to enhance the effect of nozzle-defect correction, as described below. A third variant of the first embodiment will be described below, taking an example of using yellow ink to increase the wetting spread range of black ink, without involving white correction as in the first embodiment.

In the present variant, when a black inkjet nozzle is a defective nozzle, yellow ink, which has a higher brightness value than black ink, is ejected onto the base material 12 in correction regions before black ink is ejected, to enhance the effect of nozzle-defect correction. Moreover, instead of performing white correction as in the first embodiment, the process of correcting density data is performed such that the inkjet head 150(Y) ejects yellow ink to increase the wetting spread range of black ink (this process will be referred to below as "yellow correction").

It should be noted that the regions where yellow ink is ejected to enhance the effect of nozzle-defect correction are limited to those excluding the regions where yellow ink is ejected to form a printed image. Limiting the regions where yellow ink is ejected in this manner prevents a reduction in printing quality caused by using yellow ink to increase the wetting spread range of black ink.

Figure 31:
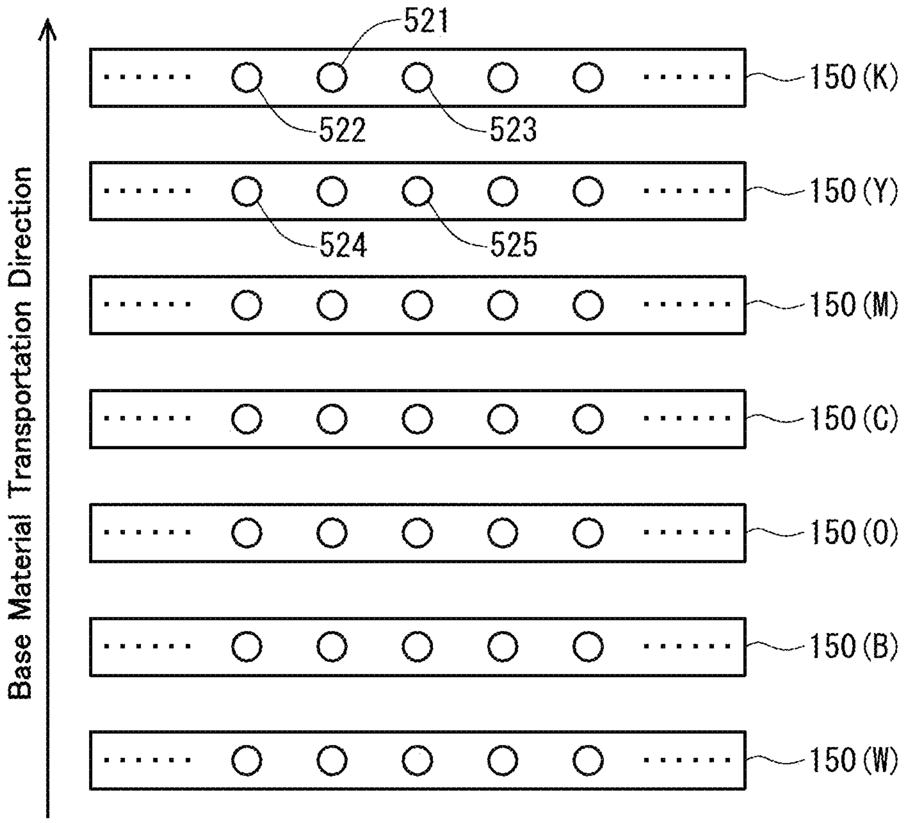
FIG. 31 is a diagram outlining yellow correction in a third variant of the first embodiment.

Here, it is assumed that among the numerous nozzles in the black inkjet head 150(K), the nozzle denoted by reference numeral 521 in FIG. 31 is a defective nozzle. In this case, when nozzle-defect correction, as described above, is performed, the defect-adjacent nozzles (denoted by reference numerals 522 and 523) eject black ink more than originally intended. Moreover, when yellow correction is performed, the yellow inkjet nozzles (denoted by reference numerals 524 and 525) corresponding to the defect-adjacent nozzles eject yellow ink.

Figure 32:
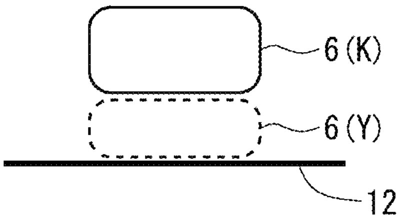
FIG. 32 is a diagram describing ink ejection in a region subjected to yellow correction in the third variant of the first embodiment.

When yellow correction is performed, the yellow inkjet nozzles corresponding to the defect-adjacent nozzles initially eject yellow ink onto the base material 12 during printing. Thereafter, the defect-adjacent nozzles eject black ink. That is, in the regions subjected to yellow correction, black ink 6(K) is ejected onto yellow ink 6(Y) that has been ejected onto the base material 12, as schematically shown in FIG. 32.

In another example, when a black inkjet nozzle is a defective nozzle, blue ink, which barely differs in color from black ink, may be ejected onto the base material 12 in correction regions before black ink is ejected, to enhance the effect of nozzle-defect correction. In such a case, instead of performing white correction as in the first embodiment, the process of correcting density data may be performed such that the inkjet head 150(B) ejects blue ink to increase the wetting spread range of black ink (this process will be referred to below as "blue correction"), thereby allowing ejection control similar to that used in yellow correction.

In the present variant, neither white nor transparent ink is used. Accordingly, applying the configuration of the present variant to an inkjet printing apparatus that uses only process-color ink for printing also effectively suppresses the occurrence of image defects (such as density decreases appearing as streaks due to dot missing) in printed images caused by the presence of defective black inkjet nozzles.

2. Second Embodiment

<2.1 Outline>

Figure 33:
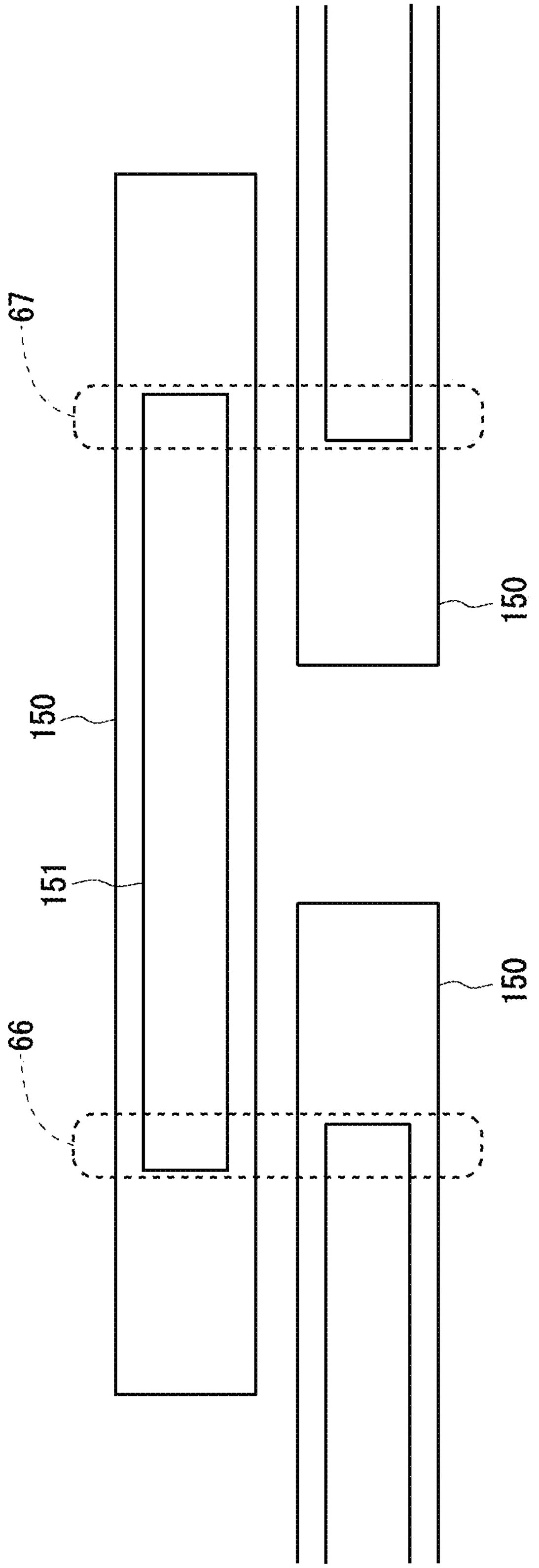
FIG. 33 is a diagram outlining a second embodiment of the present invention.

The recording portion 15 includes the inkjet heads 150(W), 150(B), 150(O), 150(C), 150(M), 150(Y), and 150(K), which respectively eject white, blue, orange, cyan, magenta, yellow, and black inks, and each inkjet head 150 is provided in plurality for the same color, as described below. For each of the inkjet heads 150(W), 150(B), 150(O), 150(C), 150(M), 150(Y), and 150(K), the inkjet heads 150 for the same color are arranged, for example, in a staggered manner, as shown in FIG. 33. Consequently, uneven density and color may appear in overlapping portions between regions where one inkjet head 150 ejects ink and regions where adjacent inkjet heads 150 eject ink (these overlapping portions will be referred to below as "head overlap alignment regions"). For example, in FIG. 33, uneven density and color may appear in regions where the nozzles in the portions denoted by reference numerals 66 and 67 eject ink. Therefore, in the present embodiment, unlike in the first embodiment, white correction is performed with a view to mitigating the reduction in printing quality caused by a plurality of inkjet heads 150 ejecting ink into the same region on the base material 12. Moreover, when the base material used for printing is not white, transparent correction is performed instead of white correction. However, in the following, for the sake of convenience, the base material used for printing is assumed to be white, and white correction is performed to mitigate the reduction in printing quality in the head overlap alignment regions.

The overall configuration of the printing system (see FIG. 1), the configuration of the inkjet printing apparatus 10 (see FIG. 2), the configuration of the recording portion 15 (see FIG. 3), the configuration of the ink ejection surface of the inkjet head 150 (see FIG. 4), the arrangement of the nozzles 152 in the head module 151 (see FIG. 5), and the hardware configuration of the print controller 200 (see FIG. 6) are the same as in the first embodiment.

<2.2 Density Correction>

Hereinafter, density correction in the present embodiment will be described.

<2.2.1 Functional Configuration>

Figure 34:
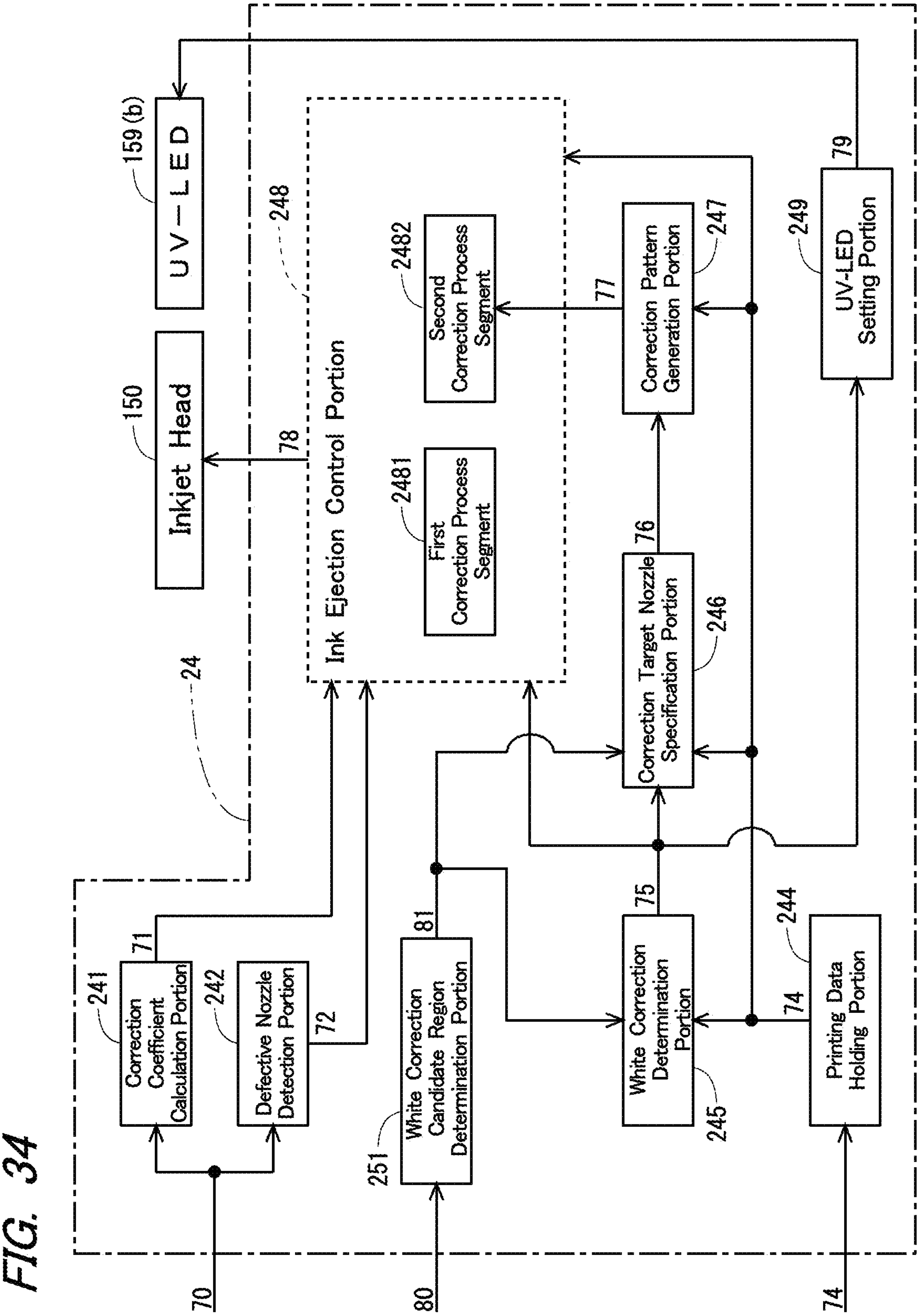
FIG. 34 is a block diagram illustrating in detail the functional configuration of a density correction process section in the second embodiment.

FIG. 34 is a block diagram illustrating in detail the functional configuration of the density correction process section 24 in the present embodiment. As can be appreciated from FIG. 34 along with FIG. 27, the density correction process section 24 in the present embodiment includes a white correction candidate region determination portion 251, in addition to the components in the first variant of the first embodiment (where the transparent correction-related components in the first embodiment are omitted). The correction coefficient calculation portion 241, the defective nozzle detection portion 242, the printing data holding portion 244, the correction pattern generation portion 247, the ink ejection control portion 248, and the UV-LED setting portion 249 operate in the same manner as the equivalent components in the first variant of the first embodiment, i.e., the correction coefficient calculation portion 241, the defective nozzle detection portion 242, the printing data holding portion 244, the correction pattern generation portion 247*a*, the ink ejection control portion 248, and the UV-LED setting portion 249. Note that in the present embodiment, the white correction candidate region determination portion 251, the white correction determination portion 245, the correction target nozzle specification portion 246, and the correction pattern generation portion 247 constitute a correction region determination portion.

The white correction candidate region determination portion 251 is configured to determine a white correction candidate region 81, which serves as a candidate region for white correction, based on head information 80, which includes details of the position of the head module 151 in each inkjet head 150. In the present embodiment, for example, the head overlap alignment regions where the nozzles included in the portions denoted by reference numerals 66 and 67 in FIG. 33 eject ink are determined as white correction candidate regions 81.

The white correction determination portion 245 is configured to determine whether to execute white correction, based on the base material information 73, the white correction candidate regions 81, and the printing data 74. The white correction determination portion 245 then outputs a determination result 75. In the present embodiment, as in the first embodiment, when the base material information 73 indicates that the base material used for printing is not white, white correction is determined not to be executed. Moreover, when the printing data 74 indicates that based on the white correction candidate regions 81, the regions include portions to be printed in a single color, white correction is determined to be executed. In this manner, white correction is performed only in regions with noticeable uneven density, minimizing unnecessary white ink consumption. Note that in the present embodiment, white correction is performed only in regions printed in a single color, but to suppress the occurrence of uneven color, white correction may also be performed in regions printed in mixed colors.

The correction target nozzle specification portion 246 is configured to specify correction target nozzles among the numerous white inkjet nozzles in the white inkjet heads 150(W) based on the white correction candidate regions 81 and the printing data 74 when the determination result 75 outputted by the white correction determination portion 245 indicates that white correction should be executed. The correction target nozzle specification portion 246 then outputs correction target nozzle information 76, which specifies the correction target nozzles. Note that, since the parts of the head modules that correspond to the white correction candidate regions 81 include numerous nozzles, more white inkjet nozzles are typically specified as correction target nozzles compared to the first embodiment and the first variant thereof. Therefore, the correction pattern generation portion 247 generates the correction pattern 77 with a larger region targeted for white ink ejection (i.e., a larger correction region) compared to the first embodiment.

Figure 35:
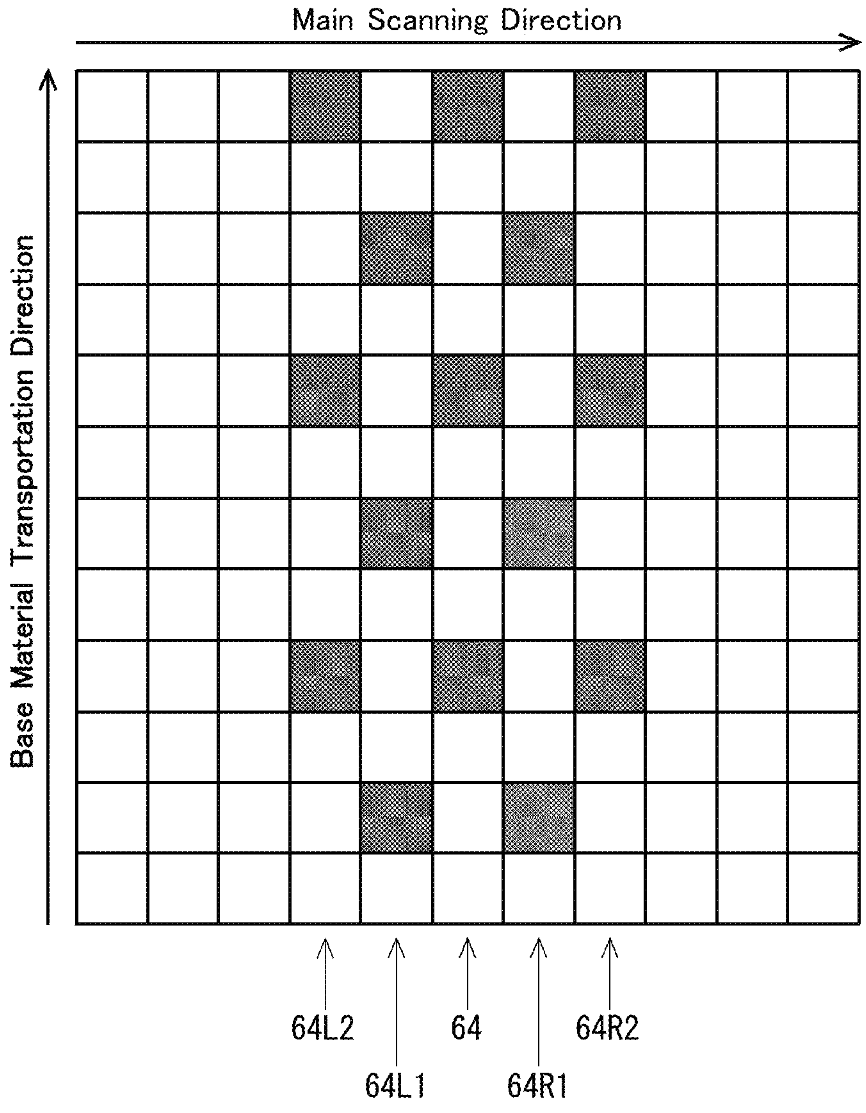
FIG. 35 is a diagram illustrating an example of a template for white correction in the second embodiment.

Incidentally, in the present embodiment, a plurality of templates are prepared in advance. Based on these templates, the correction pattern 77 can be generated. The template to be used is selected based on the print rate specified by the printing data 74. For example, the templates shown in FIGS. 18 and 35 are prepared in advance. The template shown in FIG. 18 is used when the print rate is higher than a predetermined threshold, while the template shown in FIG. 35 is used when the print rate is less than or equal to the predetermined threshold. Note that when the template shown in FIG. 35 is used, as in the case where the template shown in FIG. 18 is used, the nozzles that eject ink at the pixels in the columns denoted by reference numerals 64, 64L1, 64R1, 64L2, and 64R2 are specified as correction target nozzles among the numerous nozzles in the white inkjet heads 150(W). Moreover, in the case where the template shown in FIG. 35 is used, one pixel where white ink is ejected alternates with three pixels where white ink is not ejected when viewed in the transportation direction of the base material 12.

<2.2.2 Procedure>

Figure 36:
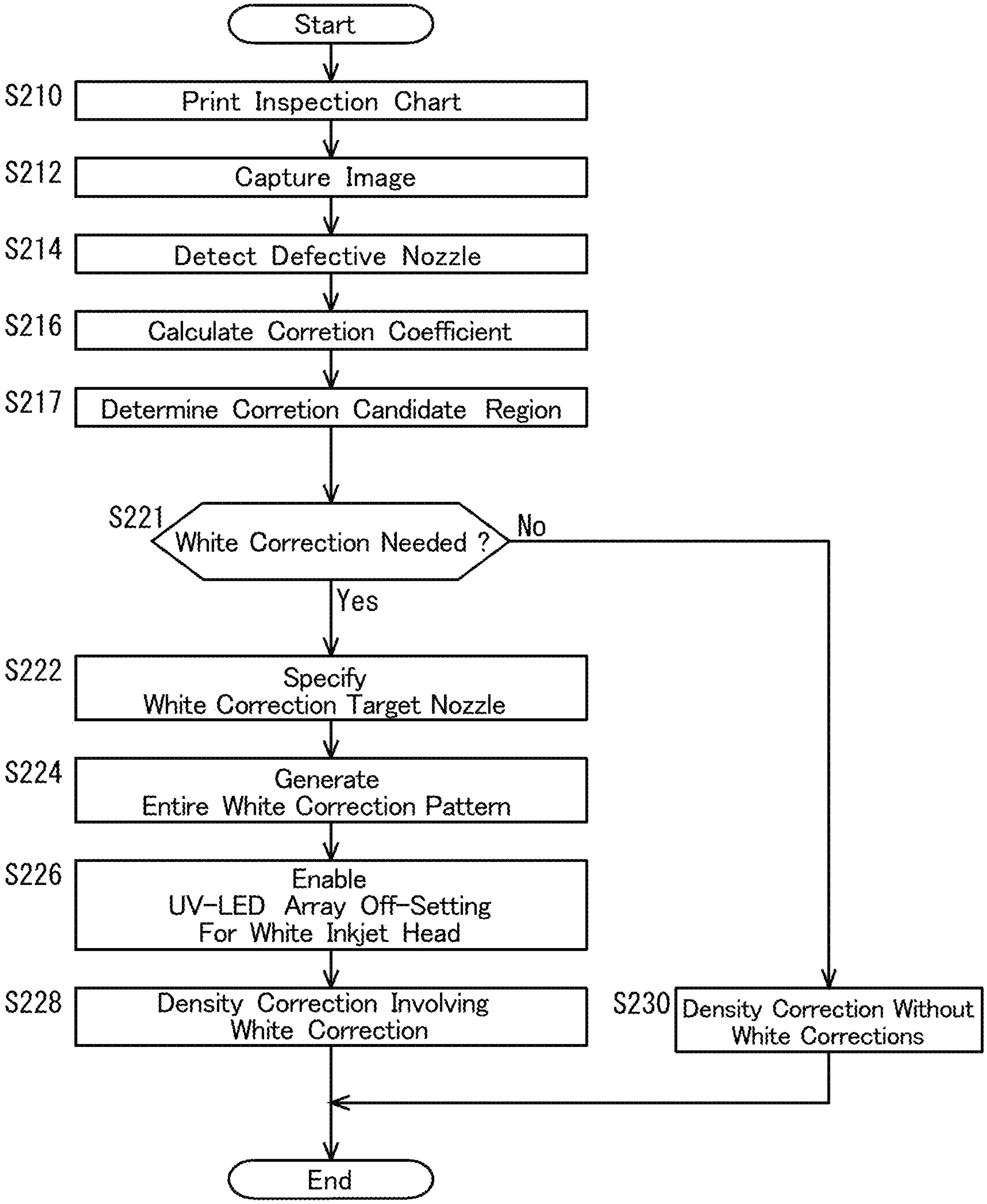
FIG. 36 is a flowchart describing the procedure for density correction in the second embodiment.

The procedure for density correction in the present embodiment will be described below with reference to FIG. 36. In the present embodiment, the main part of the density correction process section 24 shown in FIG. 34 (excluding the components implemented by hardware) are implemented through software by the CPU 211 in the control portion 200 shown in FIG. 6 performing the density correction process described in the procedure shown in FIG. 36, in accordance with the printing control program P. In the density correction process, the CPU 211 operates as described below.

Figure 28:
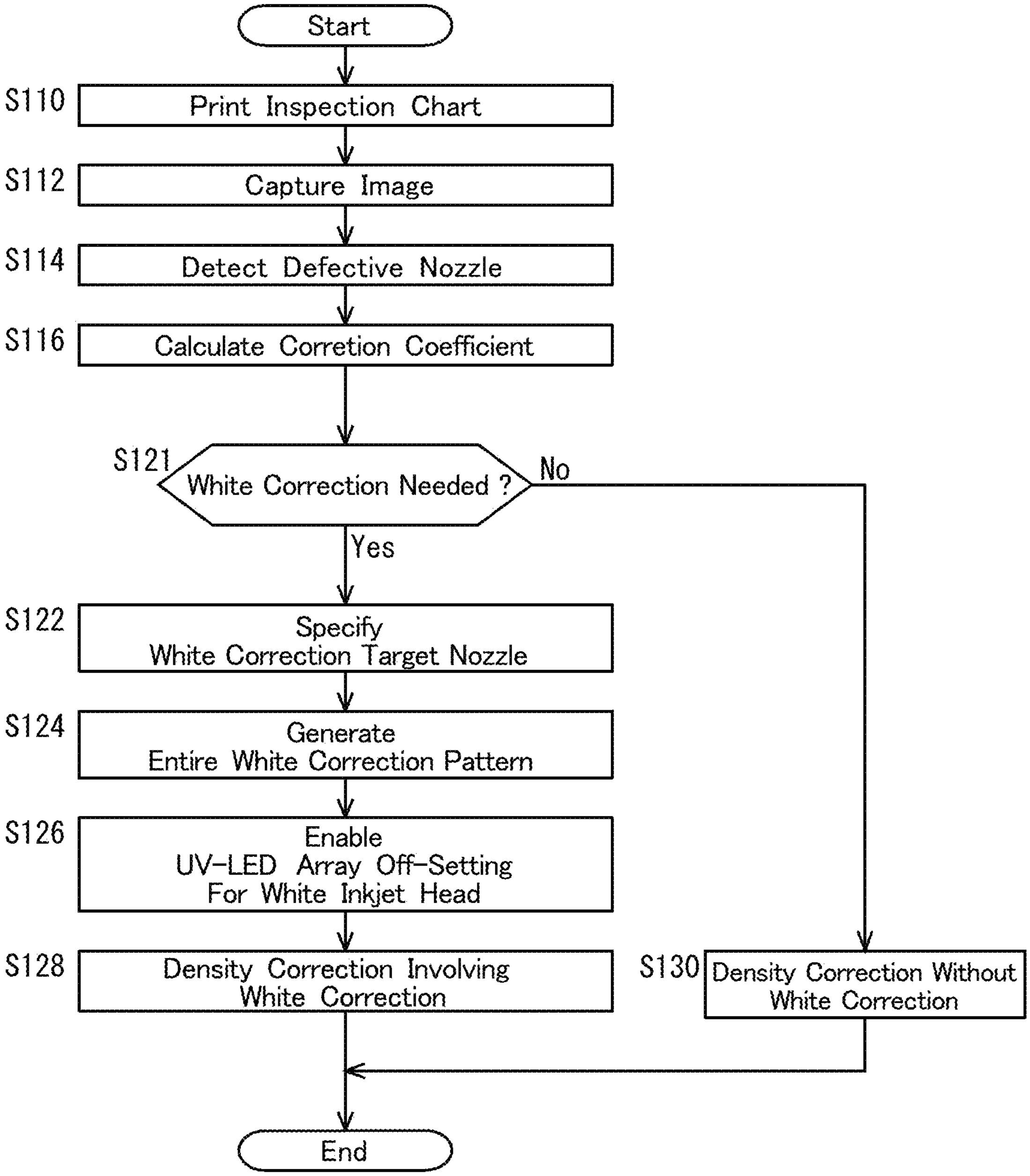
FIG. 28 is a flowchart describing the procedure for density correction in the first variant of the first embodiment.

The processing from step S210 to step S216 is the same as that from step S110 to step S116 in the first variant of the first embodiment (see FIG. 28).

In step S217, the CPU 211 determines the white correction candidate regions 81 based on the head information 80, as described above.

At step S221, the CPU 211 determines whether to execute white correction based on the printing data 74 and the white correction candidate regions 81 determined at step S217. As a result, if white correction needs to be executed, the process advances to step S222, and if white correction does not need to be executed, the process advances to step S230. Note that in the present embodiment, white correction is determined to be executed when the white correction candidate regions 81 include portions to be printed in a single color.

At step S222, the CPU 211 determines the correction target nozzles based on the printing data 74 and the white correction candidate regions 81.

The processing from step S224 to step S230 is the same as that from step S124 to step S130 in the first variant of the first embodiment.

During the density correction process with the CPU 211 operating as described above, in the present embodiment, step S217 implements the white correction candidate region determination portion 251 (see FIG. 34), while as in the first variant of the first embodiment, steps S214, S216, S221, S222, S224, S226, S228, and S230 respectively implement the defective nozzle detection portion 242, the correction coefficient calculation portion 241, the white correction determination portion 245, the correction target nozzle specification portion 246, the correction pattern generation portion 247, the UV-LED setting portion 249, the second correction process segment 2482, and the first correction process segment 2481.

<2.3 Effects>

In the present embodiment, white correction is performed on the density data such that white inkjet nozzles identified based on a predetermined pattern eject white ink in portions to be printed in a single color within the head overlap alignment regions. As described above, the wetting spread ranges of color inks on the base material 12 are larger when the color inks are ejected onto white ink that has been ejected onto the base material 12 than when the color inks are ejected directly onto the base material 12. Therefore, each inkjet head 150 ejects ink based on the density data subjected to white correction, resulting in the color inks sufficiently spreading on the base material 12 in the regions targeted for white correction and effectively suppressing the occurrence of uneven density in the head overlap alignment regions. This allows the inkjet printing apparatus 10 to produce high-quality print products. Note that in the present embodiment, white correction is performed only in correction regions to be printed in a single color, but white correction may be performed similarly in regions to be printed in mixed colors and determined as correction regions. In such a case, the occurrence of uneven color in the head overlap alignment regions can also be suppressed effectively. In this manner, the occurrence of uneven density and color is suppressed effectively in the head overlap alignment regions, resulting in a reduced necessity of reprinting and reduced consumption of the base material and ink compared to conventional practices. This contributes to efforts in achieving SDGs.

3. Others

The present invention is not limited to the embodiments and the variants, and various modifications can be made without departing from the spirit of the invention. For example, while the embodiments are directed to the inkjet printing apparatus 10 performing printing with UV ink, the present invention can also be applied to an inkjet printing apparatus that use ink being curable through irradiation other than ultraviolet.

Furthermore, in the embodiments, the inkjet printing apparatus is of a so-called single-pass type, which forms printed images on the base material by ejecting ink through the inkjet heads while transporting the base material toward the inkjet heads. However, the present invention can also be applied to an inkjet printing apparatus of a so-called shuttle type, which form printed images on the base material by ejecting ink through the inkjet heads while moving the inkjet heads relative to the base material. In the latter case, the transportation portion for conveying the printing medium also serves as the means for moving the inkjet heads relative to the base material.

Furthermore, in the embodiments, white correction is performed when the base material is white, while transparent correction is performed when the base material is not white. However, transparent correction may also be performed on white base materials. Specifically, depending on the printing apparatus, the recording portion 15 includes the inkjet head 150(E) for ejecting transparent ink and the UV-LED array 159(*a*) for curing the transparent ink but includes neither the inkjet head 150(W) for ejecting white ink nor the UV-LED array 159(*b*) for curing the white ink. In such a case, the same processing as that performed at step S141 in FIG. 21 is carried out to determine whether transparent correction needs to be executed, based on the printing data 74 and the details of defective nozzle detection at step S114 (i.e., the defective nozzle information 72).

While the embodiments and the variants have been described above to disclose the present invention, the foregoing description is illustrative in all respects and not restrictive. It is understood that numerous other modifications and variations can be devised without departing from the scope of the invention. Additionally, any of the first and second embodiments and the variants thereof may be combined within the range that does not contradict the spirit of the invention and is not technically inconsistent.

This application claims priority based on Japanese Patent Application No. 2024-015078 filed on Feb. 2, 2024 and entitled "Printing Apparatus and Printing Method", the disclosure of which is incorporated herein by reference.

What is claimed is:

1. A printing apparatus for forming a printed image on a printing medium by ejecting ink onto the printing medium based on printing data, comprising:

- a transportation portion configured to transport the printing medium;
- a first inkjet head configured to eject a first ink onto the printing medium being transported by the transportation portion, the first inkjet head including a plurality of ink ejection ports;
- a second inkjet head configured to eject a second ink onto the printing medium being transported by the transportation portion, the second inkjet head including a plurality of ink ejection ports;
- a third inkjet head configured to eject a third ink onto the printing medium being transported by the transportation portion, the third inkjet head including a plurality of ink ejection ports and being disposed upstream of the first and second inkjet heads when viewed in a direction in which the printing medium is transported by the transportation portion;
- a processor; and
- a memory that stores a program, wherein
- the first ink has a larger wetting spread range on the printing medium when the first ink is ejected onto the third ink on the printing medium than when the first ink is ejected directly onto the printing medium,
- the second ink has a larger wetting spread range on the printing medium when the second ink is ejected onto the third ink on the printing medium than when the second ink is ejected directly onto the printing medium,
- if the first and second inks are ejected so as to mix, the wetting spread ranges of the first and second inks on the printing medium are larger when the first and second inks are ejected onto the third ink on the printing medium than when the first and second inks are ejected directly onto the printing medium, and
- the program, when executed by the processor, causes the processor to perform:

determining a correction region that is to be corrected using the third ink in the printed image formed on the printing medium; and controlling the first inkjet head, the second inkjet head, and the third inkjet head to eject the third ink into the correction region before ejecting the first ink to form the printed image and to eject the third ink into the correction region before ejecting the second ink to form the printed image.

2. The printing apparatus according to claim 1, wherein in the determining the correction region, the correction region is determined based on a position of a defective ink ejection port that is an ink ejection port having ejection failure among the ink ejection ports included in the first or second inkjet head.

3. The printing apparatus according to claim 2, wherein in the determining the correction region, the correction region is determined so as to include a portion where the third ink is ejected through an ink ejection port included in the third inkjet head and corresponding to an ink ejection port adjacent to the defective ink ejection port.

4. The printing apparatus according to claim 2, wherein in the determining the correction region, when the correction region is a single-color region where either the first or second ink is ejected, the correction region is determined based on the printing data so as to include only a portion where an amount of the ejected ink is higher than a predetermined first determination criterion value and when the correction region is a mixed-color region where both the first and second inks are ejected so as to mix in colors, the correction region is determined based on the printing data so as to include only a portion where the first and second inks are ejected with a total area coverage higher than a predetermined second determination criterion value and where an amount of ink in the color from either the first or second inkjet head including the defective ink ejection port is higher in percentage relative to the total area coverage than a predetermined third determination criterion value.

5. The printing apparatus according to claim 4, wherein the second determination criterion value is higher than the first determination criterion value.

6. The printing apparatus according to claim 2, wherein in the determining the correction region, the correction region is determined such that one pixel where the third ink is ejected alternates with one pixel where the third ink is not ejected when viewed in the direction in which the printing medium is transported by the transportation portion.

7. The printing apparatus according to claim 2, wherein in the determining the correction region, the correction region is determined such that two pixels where the third ink is ejected alternate with two pixels where the third ink is not ejected when viewed in the direction in which the printing medium is transported by the transportation portion.

8. The printing apparatus according to claim 1, wherein each of the first and second inkjet heads is provided in plurality and arranged in a staggered manner, and in the determining the correction region, the correction region is determined for each of the first and second inkjet heads so as to include an overlapping portion between a region where one inkjet head ejects ink and a region where another inkjet head ejects ink.

9. The printing apparatus according to claim 8, wherein in the determining the correction region, the correction region is determined such that one pixel where the third ink is ejected alternates with one pixel where the third ink is not ejected when viewed in the direction in which the printing medium is transported by the transportation portion.

10. The printing apparatus according to claim 8, wherein in the determining the correction region, the correction region is determined such that one pixel where the third ink is ejected alternates with three pixels where the third ink is not ejected when viewed in the direction in which the printing medium is transported by the transportation portion.

11. The printing apparatus according to claim 1, wherein in the determining the correction region, the correction region is determined so as to exclude any region where the third ink is ejected to form the printed image.

12. The printing apparatus according to claim 1, wherein the first, second, and third inks are ultraviolet-curable inks.

13. The printing apparatus according to claim 12, further comprising:

a first ultraviolet irradiation portion configured to cure the first and second inks ejected onto the printing medium by the first and second inkjet heads through ultraviolet irradiation; and a second ultraviolet irradiation portion configured to cure the third ink ejected onto the printing medium by the third inkjet head through ultraviolet irradiation, wherein the program, when executed by the processor, further causes the processor to perform controlling the ultraviolet irradiation by the second ultraviolet irradiation portion, wherein in the controlling the ultraviolet irradiation, when the third ink is ejected into the correction region, the second ultraviolet irradiation portion is disabled from performing the ultraviolet irradiation or caused to perform the ultraviolet irradiation at a reduced intensity.

14. The printing apparatus according to claim 12, wherein the third inkjet head is capable of ejecting the third ink in a plurality of droplet sizes, and in the controlling the first inkjet head, the second inkjet head, and the third inkjet head, the third inkjet head is controlled to eject the third ink such that the droplet size of the third ink ejected by the third inkjet head increases as a distance from an inkjet head ejecting a color ink onto the third ink in the correction region to the first ultraviolet irradiation portion decreases, with the inkjet head ejecting the color ink being either the first or second inkjet head ejecting the first or second ink.

15. The printing apparatus according to claim 1, wherein the third inkjet head is capable of ejecting the third ink in a plurality of droplet sizes, and in the controlling the first inkjet head, the second inkjet head, and the third inkjet head, the third inkjet head is controlled to eject the third ink such that the third ink is ejected into the correction region in the smallest of the droplet sizes.

16. The printing apparatus according to claim 1, wherein the printing medium is white, the first and second inks are different process-color or spot-color inks, and the third ink is white.

17. The printing apparatus according to claim 1, wherein, the first and second inks are different process-color or spot-color inks, and the third ink is transparent.

18. The printing apparatus according to claim 1, wherein the third ink is selected based on brightness or color differences in relation to the first and second inks.

19. A printing method using a printing apparatus for forming a printed image on a printing medium based on printing data, including a transportation portion configured to transport the printing medium, a first inkjet head configured to eject a first ink onto the printing medium being transported by the transportation portion, a second inkjet head configured to eject a second ink onto the printing medium being transported by the transportation portion, and a third inkjet head configured to eject a third ink onto the printing medium being transported by the transportation portion, the method comprising:

ejecting the first ink through the first inkjet head to form the printed image;

ejecting the second ink through the second inkjet head to form the printed image;

determining a correction region that is to be corrected using the third ink in the printed image formed on the printing medium;

ejecting the third ink into the correction region through the third inkjet head before the first ink is ejected to form the printed image; and ejecting the third ink into the correction region through the third inkjet head before the second ink is ejected to form the printed image, wherein the first ink has a larger wetting spread range on the printing medium when the first ink is ejected onto the third ink on the printing medium than when the first ink is ejected directly onto the printing medium, the second ink has a larger wetting spread range on the printing medium when the second ink is ejected onto the third ink on the printing medium than when the second ink is ejected directly onto the printing medium, and if the first and second inks are ejected so as to mix, the wetting spread ranges of the first and second inks on the printing medium are larger when the first and second inks are ejected onto the third ink on the printing medium than when the first and second inks are ejected directly onto the printing medium.

* * * * *